United States Patent
Hotta et al.

(10) Patent No.: US 6,904,893 B2
(45) Date of Patent: Jun. 14, 2005

(54) FUEL INJECTION METHOD IN FUEL INJECTOR

(75) Inventors: Yoshihiro Hotta, Nagoya (JP); Yoshifumi Wakisaka, Aichi-gun (JP); Kiyomi Kawamura, Nisshin (JP); Kiyomi Nakakita, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/485,181

(22) PCT Filed: Jul. 11, 2003

(86) PCT No.: PCT/JP03/08855

§ 371 (c)(1),
(2), (4) Date: Jan. 29, 2004

(87) PCT Pub. No.: WO2004/007946

PCT Pub. Date: Jan. 22, 2004

(65) Prior Publication Data

US 2004/0194756 A1 Oct. 7, 2004

(30) Foreign Application Priority Data

Jul. 11, 2002 (JP) ........................................ 2002-203204

(51) Int. Cl.$^7$ .............................................. F02M 47/00
(52) U.S. Cl. ....................... 123/447; 123/299; 123/457; 123/467
(58) Field of Search .................................. 123/299, 446, 123/447, 457, 467

(56) References Cited

U.S. PATENT DOCUMENTS

| 6,453,875 | B1 | * | 9/2002 | Mahr et al. | 123/446 |
| 6,491,017 | B1 | * | 12/2002 | Mahr et al. | 123/299 |
| 6,688,277 | B1 | * | 2/2004 | Mahr et al. | 123/299 |

FOREIGN PATENT DOCUMENTS

| JP | A 57-193060 | 12/1982 |
| JP | U 61-149770 | 9/1986 |
| JP | A 2002-364484 | 12/2002 |
| JP | A 2003-148275 | 5/2003 |
| WO | WO 00/55496 | 9/2000 |

* cited by examiner

*Primary Examiner*—Tony M. Argenbright
(74) *Attorney, Agent, or Firm*—Oliff & Berridge, PLC

(57) ABSTRACT

In fuel injector including an accumulator and an intensifier, fuel is injected such that an injection control valve and a piston control valve are individually controlled, an operational phase difference therebetween is regulated, and at least one of a maximum injection pressure, a rate of increase of an injection pressure at the start of an increase of pressure, a rate of decrease of the injection pressure at the completion of injection, a pilot injection pressure, and an after injection pressure of fuel injected from a fuel injection nozzle is arbitrarily changed. Namely, a pressure during a movement from a base common rail pressure of the accumulator to a static maximum pressure statically determined by an operation of the intensifier is positively used as a control factor of injection, whereby a fuel injection pattern can be implemented with an extremely high degree of freedom.

11 Claims, 26 Drawing Sheets

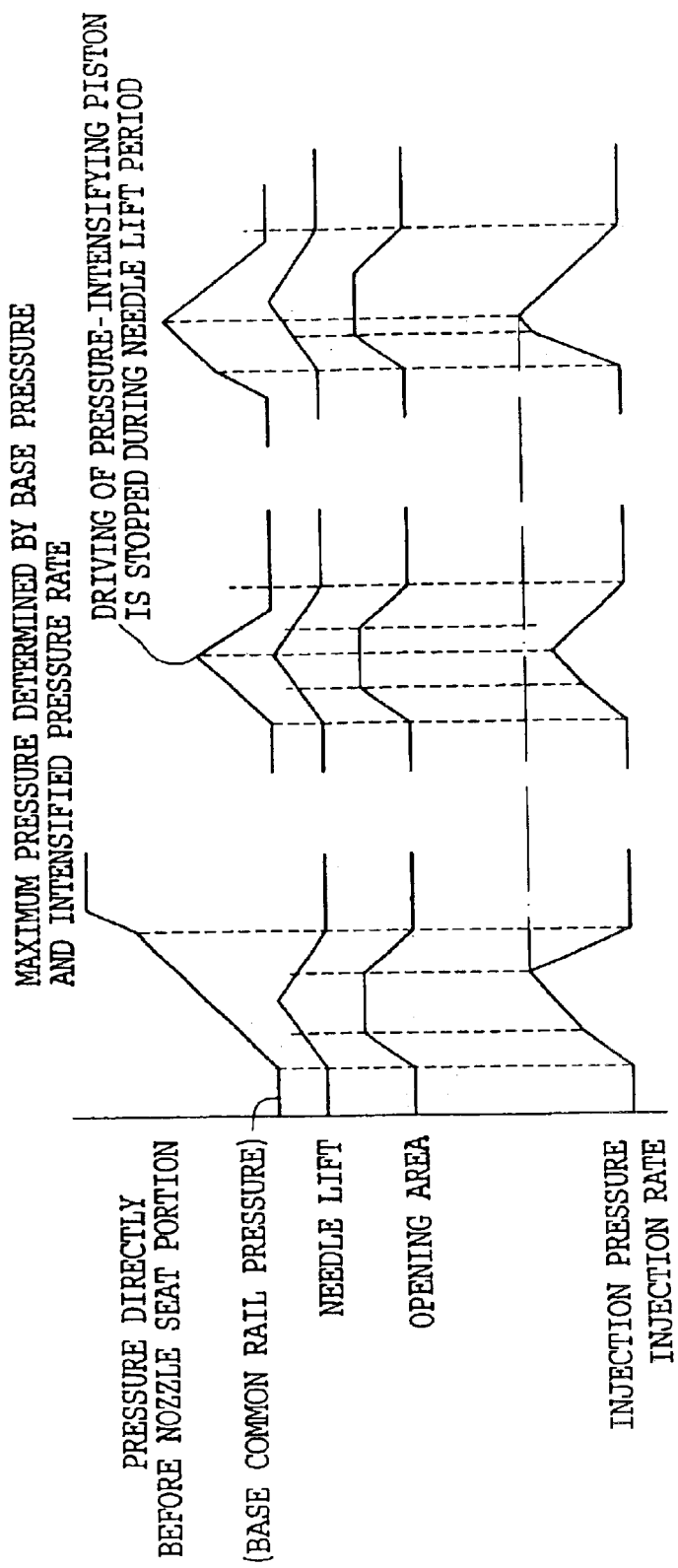

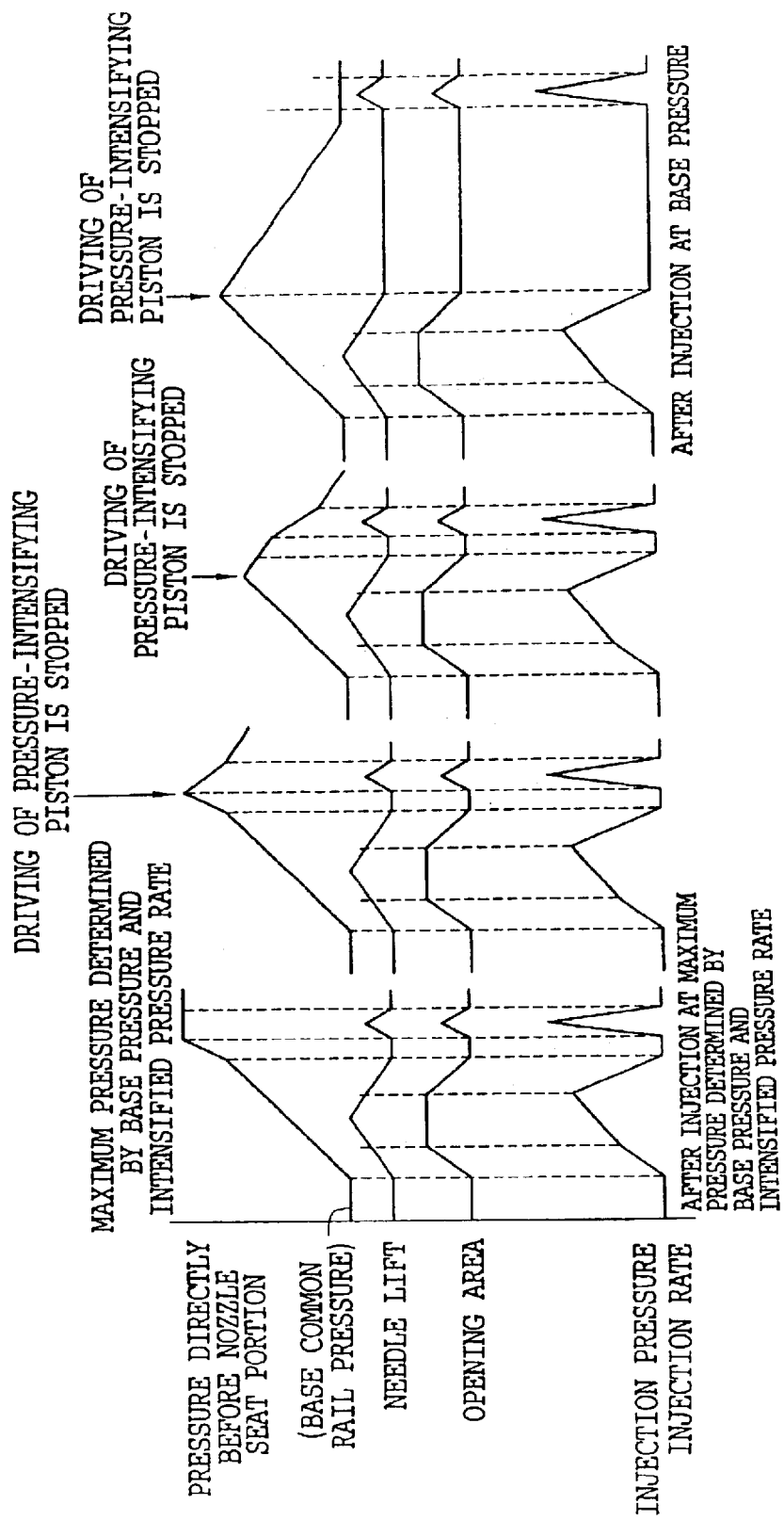

IN CASE OF RECTANGULAR INJECTION RATE

IN CASE OF SUPPRESSED INITIAL INJECTION RATE

IN CASE OF RECTANGULAR INJECTION RATE

IN CASE OF SUPRESSED INITIAL INJECTION RATE

NEEDLE LIFT PERIOD
(CONTROLLED BY INJECTION
CONTROL VALVE)

PRESSURE-INTENSIFYING
PISTON CONTROL VALVE
OPENING AREA

PRESSURE-INTENSIFYING
PISTON POSITION (REFERENCE POSITION)

(DISPLACEMENT LARGE)

PRESSURE DIRECTLY
BEFORE NOZZLE
SEAT PORTION

INJECTION
PRESSURE (A)　θ1 MODIFIED PATTERN

PRESSURE-INTENSIFYING PISTON CONTROL VALVE OPENING AREA

NEEDLE LIFT PERIOD (CONTROLLED BY INJECTION CONTROL VALVE)

PRESSURE-INTENSIFYING PISTON POSITION (REFERENCE POSITION)

(DISPLACEMENT LARGE)

PRESSURE DIRECTLY BEFORE NOZZLE SEAT PORTION

INJECTION PRESSURE (B)  θ2 MODIFIED PATTERN
(BASED ON INTERMEDIATE PATTERN IN FIG. 12)

(C)  θ3 MODIFIED PATTERN (BASED ON INTERMEDIATE PATTERN IN FIG. 13)

BOOT MAIN INJECTION + MEDIUM PRESSURE AFTER INJECTION

FIG.26
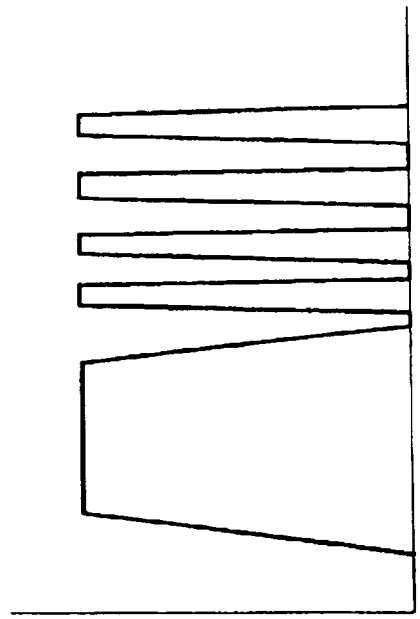
= EQUIVALENT
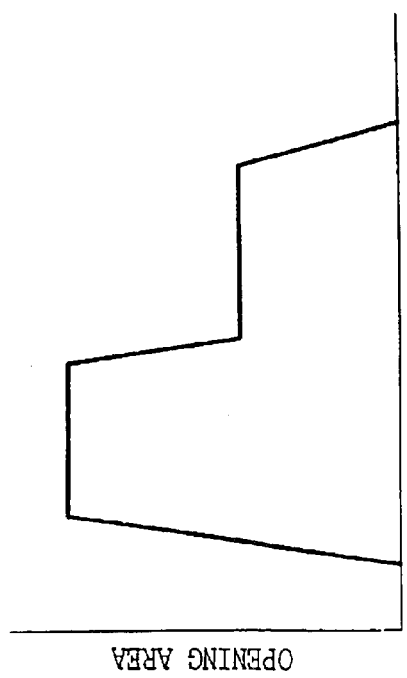

FUEL INJECTION METHOD IN FUEL INJECTOR

FIELD OF THE INVENTION

The present invention relates to a fuel injection method in a fuel injector for injecting a pressurized fuel oil from a fuel injection nozzle.

BACKGROUND ART

An accumulating type (common rail type) fuel injector is known in which a fuel pumped from a high pressure feed pump is accumulated by an accumulator (so-called "common rail"), and then injected from a fuel injection nozzle into an engine cylinder at a predetermined timing.

In such an accumulator fuel injector, even when an engine speed is low, a predetermined fuel injection pressure can be maintained (the fuel injection pressure does not deteriorate). Accordingly, high pressure fuel injection contributes a great deal to an improvement of fuel consumption or high power of engine.

However, it is known that the smaller the nozzle injection opening diameter of a fuel injector, the more effective for realizing an excellent emission (for cleaning up exhaust gas). However, when an injection pressure by a conventional accumulator fuel injector (common rail injection system) uses a nozzle injection opening diameter which is smaller than an existing one, it is assumed that an injection period becomes too long at a high engine speed and at a high load region thereby hindering a high power of fuel injection.

Further, in recent years, an engine speed of a small diesel engine tends to be made higher. Here, an air speed in an engine cylinder increases substantially in proportion to an engine speed. For this reason, with the same injection pressure as before, during a high engine speed, spray is more likely to be run than during a low engine speed, air availability in a cylinder is deteriorated, and smokes (black smokes) are easily generated. Accordingly, in order to solve this problem, it is desired to further increase an injection pressure. However, an accumulator of the conventional accumulator fuel injector (common rail injection system) has a structure of usually accumulating therein a predetermined pressure (for example, in an existing common rail system, a maximum injection pressure is about 130 Mpa). In consideration of rigidity of the fuel injector, there is a limit in ability of further increasing the existing injection pressure (in other words, it is difficult to make a conventional injection pressure extremely higher).

On the other hand, among accumulator fuel injectors, a fuel injector further comprising an intensifier has been proposed (For example, Japanese Patent Application Laid-Open No. 8-21332).

The fuel injector according to this disclosure further comprises an intensifier for further increasing a pressurized fuel oil fed from an accumulator (common rail) by operating a piston operational switch valve. The intensifier comprises a pressure-increasing piston including a large diameter piston and a small diameter piston, and a plurality of oil channels connected to the piston operational switch valve. A fuel pumped from a fuel pressure pump is flown from the accumulator into the intensifier via the piston operational switch valve, and fed to both an injection control oil chamber (injector control chamber) for controlling an injection nozzle and the injection nozzle. When fuel is injected, a fuel injection control switch valve, which is provided at the injection control oil chamber, is controlled and switched to a low pressure injection for feeding fuel oil fed unchanged from the accumulator to the injection nozzle and injecting the fuel oil or a high pressure injection for feeding fuel oil further pressurized by the intensifier to the injection nozzle and injecting the fuel oil. Accordingly, a fuel injection mode suitable for an engine driving condition can be selected.

However, in this fuel injector, there have been drawbacks resulting in the following problems.

Namely, in the fuel injector, a fuel inlet area from the accumulator to the intensifier at a large diameter piston side and a fuel exit area of the intensifier at a small diameter piston connected to the piston operational switch valve is structured constant. Therefore, a time history of a fuel pressure during an operation of the intensifier is determined merely by a fuel pressure in the accumulator. These examples are shown in FIGS. 27A and 27B. As shown in FIG. 27A, if a transverse axis refers to time (second), a time history of a fuel pressure at a downstream side of the intensifier does not depend on an engine speed. On the other hand, as shown in FIG. 27B, if a transverse axis refers to an engine crank angle, the higher the engine speed, the slower the rise of the pressure. For this reason, particularly during a high load, as an engine speed becomes higher, there is no other choice than setting further longer an injection period at a crank angle base. Such an excessively long injection period can be a cause to hinder high power, which is not preferable.

In order to avoid this problem, a method can be considered in which, as the engine speed becomes higher, the fuel pressure of the accumulator (common rail) is increased, and power acting on the intensifier is increased to thereby increase a rising rate of a fuel pressure at a downstream side of the pressure-intensifying piston. However, at medium and high load regions, an injection pressure during a main injection must be high pressure, and yet, at this point, a pilot injection (fuel injection before the main injection) or a multi-injection (a plurality of fuel injections) is carried out for a purpose of reducing noise and improving exhaust gas. However, an optimal value of an injection pressure during the pilot injection is different from that of the main injection and generally lower than that of the main injection. This is because, since fuel is injected considerably earlier than a compression top dead point, air temperature or density in a cylinder becomes low, and when an injection pressure is set excessively high, complete penetration performance of injection becomes excessively large, thus resulting in a fuel deposition on a cylinder liner surface. However, in order to allow the proposed fuel injector to generate a high injection pressure at a region of a high engine speed, since it is necessary to increase a fuel pressure acing on a large diameter piston of the intensifier (fuel pressure of the accumulator), an injection pressure during the pilot injection, which injects a fuel of the accumulator unchanged, becomes higher and exceeds the optimal value. As a result, a fuel deposition on the cylinder liner surface cannot be prevented, which is estimated to be a cause to generate an incombustible HC or smokes.

Meanwhile, in an attempt to set a pilot injection (fuel pressure of the accumulator) appropriate for a high engine speed and a pressure-intensifying piston downstream pressure appropriate for operating the intensifier (for example, if a channel resistance is reduced by enlarging a fuel channel toward an intensifier large diameter piston), when the intensifier is operated during a low engine speed, a fuel pressure at a downstream side of the pressure-intensifying piston at a crank angle base rises steeply. This provides excessively high initial injection rate, increases a premixed combustion rate, and deteriorates $NO_x$ and noise. To avoid this, in an attempt to obtain an appropriate initial injection rate during the main injection by decreasing a fuel pressure of the accumulator during a low engine speed, an atomized state of the pilot injection injected by a fuel pressure of the accumulator is deteriorated, which can be a cause to generate smokes.

On the other hand, as shown in FIG. 28, for example, if the fuel injector is provided with characteristics in which a rising rate of a fuel pressure at a downstream side of the pressure-intensifying piston during the operation of the intensifier changes with time, even at a high engine speed or at a high load, in a state in which the pilot injection is set at an optimal fuel pressure, a high fuel pressure during the main injection (fuel pressure at a downstream side of the pressure-intensifying piston) can be obtained. By this, the above-described problems can be solved, and a low $No_x$, low noise, and high power engine can be realized. However, such settings were not conventionally achieved.

In addition, conventionally, a common rail with an intensifier (WO0055496) or an oil intensifier injection system and a pressure-intensifying injection system comprising an oil pressure and cam (DE4118237 and DE4118236) have been proposed. However, being different from the present invention recognizes an injection system behavior as a dynamic transient phenomenon, these disclosures recognize a period during which a pressure changes (inclination period of a pressure) as a transition period during which pressure changes from low pressure to high pressure. Accordingly, practical problems are caused on various controls or the like for intensifying pressure.

In view of the aforementioned facts, an object of the present invention is to obtain a fuel injection method in a fuel injector in which a fuel can be injected at a super high injection pressure which is much larger than that in a conventional fuel injector, a maximum injection pressure is not determined merely by a fuel pressure of an accumulator and is able to realize excellent combustible and exhaustive characteristics, and in which fuel injection can be performed with an arbitrary fuel injection pattern, whereby a degree of freedom of a fuel injection pattern can be further expanded (in other words, a maximum injection pressure, a rate of increase of an injection pressure at the start of intensifying pressure, a rate of decrease of the injection pressure at the completion of injection, a pilot injection pressure, and an after injection pressure of a fuel can be set freely).

DISCLOSURE OF THE INVENTION

In order to accomplish the above-described objects, a first exemplary aspect of the present invention includes a fuel injection method in a fuel injector comprising an accumulator which is connected to a fuel reservoir in a fuel injection nozzle via a main oil channel (i.e., a fuel line), and which accumulates therein at a predetermined pressure fuel (i.e., oil) pumped from a fuel pressure pump, a pressure cutoff valve which is provided along the main oil channel which connects the fuel injection nozzle and the accumulator to each other to cut off fuel pressure flow from the fuel injection nozzle side to the accumulator side, an injection control oil chamber which is connected to the main oil channel at a downstream side of the pressure cutoff valve of the main oil channel which connects the fuel injection nozzle and the accumulator to each other, an injection control valve which is provided at the injection control oil chamber to perform fuel injection by closing a needle valve in the fuel injection nozzle due to an action of a fuel oil pressure upon the injection control oil chamber or by opening the needle valve due to removal of fuel oil from the injection control oil chamber, an intensifier which is connected to the fuel injection nozzle and the injection control oil chamber at a downstream side of the pressure cutoff valve of the main oil channel which connects the fuel injection nozzle and the accumulator to each other and, intensifier control means which increases a fuel pressure at a downstream side of the pressure cutoff valve by operating the intensifier, characterized in that fuel is injected by individually controlling each of the injection control valve and the intensifier control means and regulating an operational phase difference therebetween so as to arbitrarily change at least one of a maximum injection pressure, a rate of increase of the injection pressure after the start of an increase of pressure, a rate of decrease of the injection pressure directly before the completion of injection, a pilot injection pressure, and an after injection pressure, of fuel injected from the fuel injection nozzle.

A second exemplary aspect of the present invention is the fuel injection method in the fuel injector of the first exemplary aspect, characterized in that, when an amount in which fuel is injected by the fuel injection nozzle is maximum, a period during which pressure of fuel injected from the fuel injection nozzle increases corresponds to ⅓ or more of the entire injection period.

A third exemplary aspect of the present invention is the fuel injection method in the fuel injector according to the first exemplary aspect, characterized in that, when the intensifier is operated by the intensifier control means, before reaching a static maximum pressure which is statically determined by a geometric intensified pressure ratio of the intensifier and a pressure of the accumulator due to operation of the accumulator and the intensifier, the injection control valve is operated to start fuel injection from the fuel injection nozzle, and a maximum injection pressure of fuel injected from the fuel injection nozzle is set to be equal to or less than the static maximum pressure.

A fourth exemplary aspect of the present invention is the fuel injection method in the fuel injector according to the first exemplary aspect, characterized in that, when fuel injection from the fuel injection nozzle is suspended by the injection control valve, before the needle valve in the fuel injection nozzle is completely closed, operation of the intensifier control means is suspended to stop the intensifier, whereby an injection pressure of fuel injected from the fuel injection nozzle is decreased to a predetermined pressure.

A fifth exemplary aspect of the present invention is the fuel injection method in the fuel injector according to a first exemplary aspect, characterized in that an opening speed and a closing speed of the needle valve in the fuel injection nozzle is set such that the higher the fuel pressures of both the fuel reservoir in the fuel injection nozzle and the injection control oil chamber are, the higher the opening speed and the closing speed of the needle valve are.

A sixth exemplary aspect of the present invention is the fuel injection method in the fuel injector according to the first exemplary aspect, characterized in that, when an after injection of fuel is performed from the fuel injection nozzle, before the start of the after injection, operation of the intensifier control means is suspended to stop the intensifier, and the after injection is performed at an intermediate pressure between a predetermined pressure of the accumulator and a static maximum pressure which is statically determined due to operation of the accumulator and the intensifier.

A seventh exemplary aspect of the present invention is the fuel injection method in the fuel injector of the first exemplary aspect, characterized in that, when a multi-stage injection is performed in which fuel injection from the fuel injection nozzle is carried out a plurality of times per 1 cycle of an engine, the intensifier is operated at least two or more times by the intensifier control means.

The present invention can be structured by combining a plurality of the contents characterized in the second to seventh exemplary aspects.

An eighth exemplary aspect of the present invention is a fuel injection method in a fuel injector comprising an accumulator which is connected to a fuel reservoir in a fuel injection nozzle via a main oil channel, and which accumulates therein at a predetermined pressure fuel oil pumped from a fuel pressure pump, a pressure cutoff valve which is provided along the main oil channel which connects the fuel injection nozzle and the accumulator to each other to cut off fuel pressure flow from the fuel injection nozzle side to the accumulator side, an injection control oil chamber which is connected to the main oil channel at a downstream side of the pressure cutoff valve of the main oil channel which connects the fuel injection nozzle and the accumulator to each other, an injection control valve which is provided at the injection control oil chamber to perform fuel injection by closing a needle valve in the fuel injection nozzle due to an action of a fuel oil pressure upon the injection control oil chamber or by opening the needle valve due to removal of fuel oil from the injection control oil chamber, an intensifier which includes a cylinder and a piston, and which is connected to the fuel injection nozzle and the injection control oil chamber at a downstream side of the pressure cutoff valve of the main oil channel which connects the fuel injection nozzle and the accumulator to each other, and a piston control valve which moves the piston of the intensifier by causing fuel to flow from the accumulator into the cylinder or by causing fuel to flow out of the cylinder to thereby increase a fuel pressure at a downstream side of the pressure cutoff valve, characterized in that fuel is injected by controlling a moving rate of the piston of the intensifier to arbitrarily change at least one of a maximum injection pressure, a rate of increase of the injection pressure at the start of an increase of pressure, a rate of decrease of the injection pressure at the completion of injection, a pilot injection pressure, and an after injection pressure, of fuel injected from the fuel injection nozzle.

A ninth exemplary aspect of the present invention is the fuel injection method in the fuel injector according to the eighth exemplary aspect, characterized in that the fuel injection is performed by individually controlling each of the injection control valve and the piston control valve, and regulating an operational phase difference therebetween.

A tenth exemplary aspect of the present invention is the fuel injection method in the fuel injector according to the eighth exemplary aspect, characterized in that the area of the fuel channel into the cylinder is changed by the piston control valve during a period when the needle valve in the fuel injection nozzle is open.

An eleventh exemplary aspect of the present invention is the fuel injection method in the fuel injector according to the tenth exemplary aspect characterized in that the area of the fuel channel into the cylinder is changed by the piston control valve during a period when the needle valve in the fuel injection nozzle is open.

A twelfth exemplary aspect of the present invention is the fuel injection method in the fuel injector according to the tenth exemplary aspect characterized in that, when a multi-stage injection is performed in which fuel injection from the fuel injection nozzle is carried out a plurality of times per 1 cycle of an engine, a maximum area of the fuel channel into the cylinder due to the piston control valve is individually set for each injection.

A fuel injector employing a method of controlling fuel injection rate according to the first exemplary aspect of the invention comprises an accumulator, a pressure cutoff valve, an injection control oil chamber, an injection control valve, an intensifier and intensifier control means. A fuel from the accumulator (of a base common rail pressure) is fed to the intensifier and is intensified. Further, here, with respect to a fuel injection nozzle, an accumulator injection system (common rail system) is formed by "an accumulator, a pressure cutoff valve, an injection control oil chamber, and an injection control valve". Moreover, the intensifier is disposed in parallel to the accumulator injection system. In other words, with respect to the fuel injection nozzle, an accumulator injection system (jerk type injection system) is formed by "an intensifier, intensifier control means, an injection control oil chamber, and an injection control valve".

When fuel is injected by the accumulator injection system (common rail type injection system), the intensifier is disabled by the intensifier control means. Further, fuel oil fed from the accumulator is pumped to a fuel reservoir in the fuel injection nozzle via the pressure cutoff valve. At this time, the fuel oil from the accumulator is injected directly (unchanged) from the fuel injection nozzle by removing fuel oil from the injection control oil chamber by the injection control valve.

On the other hand, when fuel is injected by the intensifier injection system jerk type injection system), the intensified is enabled by the intensifier control means. Then, fuel oil further pressurized by the intensifier is pumped to the fuel reservoir in the fuel injection nozzle and the injection control oil chamber. At this time, the pressurized fuel oil further increased by the intensifier is injected from the fuel injection nozzle by removing the fuel oil of the injection control oil chamber by the injection control valve.

In this way, in the fuel injector, fuel is injected by controlling to switch to a low pressure injection for feeding fuel oil fed unchanged from the accumulator to the fuel injection nozzle and feeding the fuel oil or a high pressure injection for feeding fuel oil further pressurized by the intensifier to the fuel injection nozzle and feeding the fuel oil can be controlled due to switching to inject a fuel. Accordingly, the fuel injector can basically exhibit the following effects:

① Since a fuel fed from the accumulator (of base common rail pressure) is fed to the intensifier and further intensified and injected, an extremely high injection pressure that exceeds an injection pressure by a conventional common rail injection system can be realized. Accordingly, even at a high engine speed and at a high load, a fuel can be injected during an appropriate injection period to further increase a speed of engine. Further, since it becomes possible to improve atomization of spray by reducing a diameter of an injection opening diameter and combustion by making an injection pressure extremely higher without largely prolonging an injection period. Accordingly, oxygen within a combustion chamber can be effectively used, whereby excellent combustion state in which generation of smokes is minimized can be realized. Consequently, engine with low emission and high power can be realized. Moreover, it is not necessary to accumulate a super high injection pressure all the time. Therefore, as compared to a conventional common rail system in which a predetermined high injection pressure is accumulated all the time, the fuel injector of the present invention is advantageous, and can be manufactured inexpensively.

② The accumulator injection system (common rail injection system) and the intensifier are disposed in parallel to each other. When a fuel pressure at a downstream side of the pressure cutoff valve is below a common rail pressure, fuel is supplied from the accumulator. Therefore, when an after injection is carried out after a main injection, fuel is not injected at a pressure lower than the common rail pressure. Accordingly, since spray can be after-injected in an excellent atomized state, the after-injected fuel itself cannot be a cause to generate smokes. Consequently, a combustion promoting effect can be exhibited to the maximum by the after-injected fuel stirring a combustion place or by raising a temperature of the combustion place.

At medium and high load regions, an injection pressure during a main injection must be high, and yet, at this point, a pilot injection (or a multi-injection) is carried out before the main injection for a purpose of reducing noise and improving exhaust gas. However, an optimal value of an injection pressure during the pilot injection is different from that of the main injection and generally lower than that. Even in such a case, fuel injection can be performed by controlling a switching to a low pressure injection and a high pressure injection. Accordingly, an optimal injection pressure can be set for the pilot injection and the main injection, respectively.

Further, it is possible to inject a fuel at a common rail pressure at the start of the injection and inject the fuel further pressurized by the intensifier from the intermediate stage of the injection or it is also possible to inject a fuel at a high pressure at the start of the injection due to an operation of the intensifier, or it is possible to inject a fuel at a common rail pressure by suspending the intensifier at the intermediate of the injection. In this way, an injection at a common rail pressure and an injection due to an operation of the intensifier can be free combined to perform an injection. Accordingly, a degree of freedom of injection pattern can be expanded.

→ Conventionally, in preparing the next injection after a fuel has been injected by operating the intensifier, there is a possibility of erosion being formed on the oil channel due to generation of cavitation, which has been a cause to noticeably deteriorate a durability of the fuel injection system. On the other hand, since the fuel injector according to the first exemplary aspect is structured such that the accumulator injection system (common rail injection system) and the intensifier are disposed in parallel to each other, and a fuel pressure at a downstream side of the pressure cutoff valve is equal to or less than a common rail pressure, fuel is supplied from the common rail. Accordingly, a fuel pressure cannot be equal to or less than a vapor pressure of a fuel. For this reason, there is no need to worry about an occurrence of erosion on the oil channel due to a generation of cavitation, and the durability of the injector can be improved remarkably.

④ Since the accumulator injection system (common rail injection system) and the intensifier are disposed in parallel to each other, if the intensifier is out of order in a state in which the accumulator and the intensifier are disconnected, a fuel can be injected at a common rail pressure. Accordingly, a sudden engine stop does not occur.

In the fuel injection method according to the first exemplary aspect when fuel is injected, the injection control valve and the intensifier control means are individually controlled, respectively, and an operational phase difference therebetween is regulated. Accordingly, at least one of a maximum injection pressure, a rate of increase of the injection pressure after the start of an increase of pressure, a rate of decrease of the injection pressure directly before the completion of injection, a pilot injection pressure, and an after injection pressure, of fuel injected from the fuel injection nozzle is controlled to an optimal value in accordance with, for example, an engine speed or a load state, and fuel injection is carried out.

In other words, when the needle valve is opened and fuel injection is performed, a fuel pressure by the accumulator (base common rail pressure) and the intensified fuel pressure due to an operation of the intensifier are controlled at a high degree of freedom. Accordingly, fuel injection is carried out by regulating an operational phase difference between an opening timing of the needle valve (operation of the injection control valve) and an operational timing of the intensifier (operation of the intensifier control means) so as to obtain an optimal fuel injection pattern in accordance with, for example, an engine speed or a load state.

Namely, in accordance with the fuel injection method in the fuel injector of the present invention, while an injection pressure is progressively increased due to an operation of the intensifier, an injection timing can be selected by an opening timing of the needle valve thus making it possible to control a fuel injection pattern on the basis of a fuel injection pressure and an injection rate. Accordingly, a fuel injection pattern can be realized with an extremely high degree of freedom.

For example, as shown in FIG. 1, when a multi-injection is performed in which a pilot injection, a main injection and an after injection are carried out, a pilot injection pressure ($P_1$), a main boot injection pressure ($P_2$), a main injection maximum pressure ($P_3$), an after injection pressure ($P_a$), a pressure rising rate after a completion of a boot injection period ($\theta 1$), a pressure rising rate directly before reaching a maximum injection pressure ($\theta 2$), and a pressure drop rate at the completion of a main injection ($\theta 3$) can be controlled freely (set and performed).

Thus, in the fuel injection method in the fuel injection according to the first exemplary aspect of the invention, a fuel can be injected at a super high injection pressure which is greater than a conventional air pressure, and a maximum injection pressure is not merely determined by a fuel pressure of the accumulator, and is able to realize excellent combustible and exhaustive characteristics. Further, a pressure between a fuel pressure by the accumulator (base common rail pressure) and a static maximum pressure due to an operation of the intensifier can be used positively as a control factor of the injection, whereby fuel injection can be performed with an arbitrary fuel injection pattern, and a degree of freedom of the fuel injection pattern can be further expanded (namely, a maximum injection pressure, a rate of increase of an injection pressure at the start of an increase of pressure, a rate of decrease of the injection pressure at the completion of injection, a pilot injection pressure, and an after injection pressure of a fuel can be freely set).

In the fuel injection method in the fuel injector according to the second exemplary aspect of the invention, fuel injection (a maximum injection pressure, a rate of increase of an injection pressure at the start of an increase of pressure, a rate of decrease of the injection pressure at the completion of injection, a pilot injection pressure, and an after injection pressure of a fuel) can be appropriately controlled with the arbitrary fuel injection pattern.

In the fuel injection method in the fuel injector according to the third exemplary aspect of the present invention a rate of increase of an injection pressure of fuel injected from the fuel injection nozzle can be arbitrarily set (varied). If a predetermined pressure (base common rail pressure) of fuel oil by the accumulator and a static maximum pressure by the intensifier (intensified pressure rate) are fixed, fuel injection can be performed by an arbitrary fuel injection pattern (a rate of increase of an injection pressure).

In the fuel injection method in the fuel injector according to the fourth exemplary aspect of the present invention a rate of decrease of the injection pressure at the completion of the fuel injection of the fuel injected from the fuel injection nozzle can be arbitrarily set (varied). Accordingly, a degree of freedom in setting an injection rate can be increased.

In the fuel injection method in the fuel injector according to the fifth exemplary aspect of the present invention, the higher the fuel pressures of both a fuel reservoir in the fuel injection nozzle and the injection control oil chamber, the higher the opening speed and the closing speed of the needle valve, whereby a seat choke region (a region in which a substantial opening area of the nozzle seat is smaller than a total injection opening area of the nozzle) is gone through very quickly. Further, the lower the injection pressure, the slower the opening speed and the closing speed of the needle valve, and the seat choke region is gone through very slowly (the seat choke period becomes longer). Accordingly, fuel injection with the arbitrarily fuel injection (rate of increase of the injection pressure at the start of an increase of pressure, and a rate of decrease of the injection pressure at the completion of the injection. Moreover, the lower the fuel pressure, the slower the opening speed and the closing speed of the needle valve, and the fuel injection period becomes longer. As a result, when a timing at which an operation of the intensifier is slightly changed, the injector operates so as to keep an injection amount substantially uniform. An effect can be provided in that a variation of an injection amount can be reduced.

In the fuel injection method in the fuel injector according to the sixth exemplary aspect of the present invention when an after injection of fuel is performed from the fuel injection nozzle, before the start of the after injection, an operation of the intensifier is stopped, and the after injection is performed at an intermediate pressure between a predetermined pressure by the accumulator (base common rail pressure) and a static maximum pressure statically determined by an operation of the intensifier. Here, for example, if fuel injection is simply carried out only by two pressures including a predetermined pressure (base common rail pressure) of fuel oil by the accumulator and a static maximum injection pressure due to an operation of the intensifier, it can be considered that an after injection is carried out at a high injection pressure at short intervals after a main injection in order to reduce soot (carbon and the like) or an after injection is carried out at a low injection pressure in order to conduct an after-treatment of exhaust gas. However, as described above, if the after injection is carried out at a high injection pressure at short intervals after the main injection, when the injection pressure is too high, it causes $NO_x$ or combustion noise to increase. Namely, it is not a good idea to carry out the after injection at a high injection pressure by focusing a reduction of soot (carbons and the like), but it should be noted that an optimal pressure is existent for the injection pressure. On the other hand, when the after injection is carried out to conduct the after-treatment of exhaust gas, if the injection pressure is too low, a problem is caused in that soot or PM (particulate matters) increases due to a deterioration of spray atomization. Further, if the injection pressure is too high, fuel is deposited on a wall surface of the engine thereby causing a problem in that a piston ring is secured or oil is diluted, leading to a deterioration of emission of the engine. In other words, even when the after injection is carried out to conduct the after-treatment of exhaust gas, an optimal pressure is existent for the injection pressure. In this way, when the fuel injection is carried out merely by two pressures comprising a predetermined pressure (base common rail pressure) and a static maximum pressure due to an operation of the intensifier, an optimal fuel injection cannot be performed so as to satisfy all of the fuel injection patterns.

In this respect, in the fuel injection method in the fuel injector according to the sixth exemplary aspect of the present invention, in carrying out an after injection, before starting the after injection, the intensifier 54 is stopped, and the after injection is performed at an intermediate pressure between a base common rail pressure and a static maximum pressure. Accordingly, the suspension period of the intensifier 54 is regulated (controlled), whereby the after injection can be performed at an arbitrary optimal injection pressure enough to entirely satisfy fuel injection patterns.

In the fuel injection method in the fuel injector according to the seventh exemplary aspect of the invention, a degree of freedom of an injection pattern can be further expanded.

The fuel injection method in the fuel injector according to the eighth exemplary aspect of the invention is basically structured in the same manner as that of the first exemplary aspect described above, and is able to exhibit similar effects to those of the first exemplary aspect.

Here, the fuel injection method according to the eighth exemplary aspect of the invention in performing fuel injection, fuel is injected such that a moving rate of a piston of the intensifier is controlled, and at least one of a maximum injection pressure, a rate of increase of an injection pressure at the start of an increase of pressure, a rate of decrease of the injection pressure at the completion of injection, a pilot injection pressure, and an after injection pressure of fuel injected from a fuel injection nozzle is regulated to an optimal value in accordance with, for example, an engine speed or a load condition.

In other words, a moving speed of a piston of the intensifier is controlled such that a fuel pressure by the accumulator (base common rail pressure) and an intensified pressure (dropping pressure) of fuel due to an operation of the intensifier at the time when the needle valve is opened to perform fuel injection have an optimal fuel injection pattern in accordance with an engine speed or a load state, for example. Accordingly, a fuel injection pattern can be realized with an extremely high degree of freedom, and similar effects to those in the fuel injection method according to the first exemplary aspect can be exhibited.

For example, as shown in FIG. 1, when a multi-injection is performed in which a pilot injection, a main injection and an after injection are carried out, a pilot injection pressure ($P_1$), a main boot injection pressure ($P_2$), a main injection maximum pressure ($P_3$), an after injection pressure ($P_a$), a pressure rising rate after a completion of a boot injection period ($\theta 1$), a pressure rising rate directly before reaching a maximum injection pressure ($\theta 2$), and a pressure drop rate at the completion of a main injection ($\theta 3$) can be controlled freely (set and performed).

Thus, in the fuel injection method in the fuel injection according to the eighth exemplary aspect, a fuel can be injected at a super high injection pressure which is greater than a conventional air pressure, and a maximum injection pressure is not merely determined by a fuel pressure of the accumulator and a geometric dimensional data of the intensifier, and is able to realize excellent combustible and exhaustive characteristics. Further, fuel injection can be performed with an arbitrary fuel injection pattern, and a degree of freedom of the fuel injection pattern can be further expanded (namely, a maximum injection pressure, a rate of increase of an injection pressure at the start of an increase of pressure, a rate of decrease of the injection pressure at the completion of injection, a pilot injection pressure, and an after injection pressure of a fuel can be freely set).

In the fuel injection method in the fuel injector according to the ninth exemplary aspect of the present invention, in order to regulate a fuel injection pattern, a moving rate of the piston of the intensifier is controlled, and an operational phase difference between the injection control valve and the piston control valve is adjusted (which is structured in the same manner as in the fuel injection method according to the first exemplary aspect), fuel injection can be performed with further appropriate arbitrary fuel injection pattern, and a degree of freedom of fuel injection pattern can be expanded.

At this point, the method according to the tenth exemplary aspect of the present invention is preferable as a specific method for controlling a moving rate of the piston of the intensifier in order to regulate a fuel injection pattern.

In the fuel injection method of the tenth exemplary aspect, a fuel channel area of the cylinder is changed by the piston control valve, and a moving rate of the piston is changed. Namely, when a channel area of a fuel into the cylinder is changed by the piston control valve, an amount of a fuel flowing into/out of the cylinder is changed, and a moving rate of the piston is changed. An injection pattern of fuel injected from the fuel injection nozzle is controlled to an optimal value, and fuel injection is performed. Consequently, a fuel injection pattern is realized with an extremely high degree of freedom.

Further, in this case, when a fuel channel area of the cylinder is controlled or changed by the piston control valve, it can be realized by structuring an opening area of the channel can be changed with respect to a moving amount (lift amount) of the piston control valve. Moreover, it is more effective to use a method in which a position is controlled so as to stop the piston control valve during (halfway of) the movement or lift thereof.

In the fuel injection method in the fuel injector according to the eleventh exemplary aspect of the present invention, during the fuel injection period, a rate of increase or a rate of decrease of the injection pressure can be changed (set) arbitrarily.

In the fuel injection method in the fuel injector according to the twelfth exemplary aspect of the present invention, further appropriate fuel injection can be performed.

BRIEF DESCRIPTION OF THE DRAWINGS

FIG. 9A is a diagram illustrating an example of a fuel injection pattern in which a maximum injection pressure and a rate of decrease of injection pressure are arbitrarily set by the method of "controlling an operational phase difference between valves" among fuel injection methods in the fuel injector according to the present embodiment;

FIG. 9B is a diagram illustrating an example of a fuel injection pattern in which a maximum injection pressure and a rate of decrease of injection pressure are arbitrarily set by the method of "controlling an operational phase difference between valves" among fuel injection methods in the fuel injector according to the present embodiment;

FIG. 9C is a diagram illustrating an example of a fuel injection pattern in which a maximum injection pressure and a rate of decrease of injection pressure are arbitrarily set by the method of "controlling an operational phase difference between valves" among fuel injection methods in the fuel injector according to the present embodiment;

FIG. 10A is a diagram illustrating an example of a fuel injection pattern in which an after injection pressure is arbitrarily set by the method of "controlling an operational phase difference between valves" among fuel injection methods in the fuel injector according to the present embodiment;

FIG. 10B is a diagram illustrating an example of a fuel injection pattern in which an after injection pressure is arbitrarily set by the method of "controlling an operational phase difference between valves" among fuel injection methods in the fuel injector according to the present embodiment;

FIG. 10C is a diagram illustrating an example of a fuel injection pattern in which an after injection pressure is arbitrarily set by the method "controlling an operational phase difference between valves" among fuel injection methods in the fuel injector according to the present embodiment;

FIG. 10D is a diagram illustrating an example of a fuel injection pattern in which an after injection pressure is arbitrarily set by the method of "controlling an operational phase difference between valves" among fuel injection methods in the fuel injector according to the present embodiment;

FIG. 26 is a schematic diagram illustrating another example of the method of "changing an area of a fuel channel" among fuel injection methods in the fuel injector according to the present embodiment;

BEST MODE FOR CARRYING OUT THE INVENTION

[Fundamental Structure of an Injector]

Structural Example 1

Figure 2:
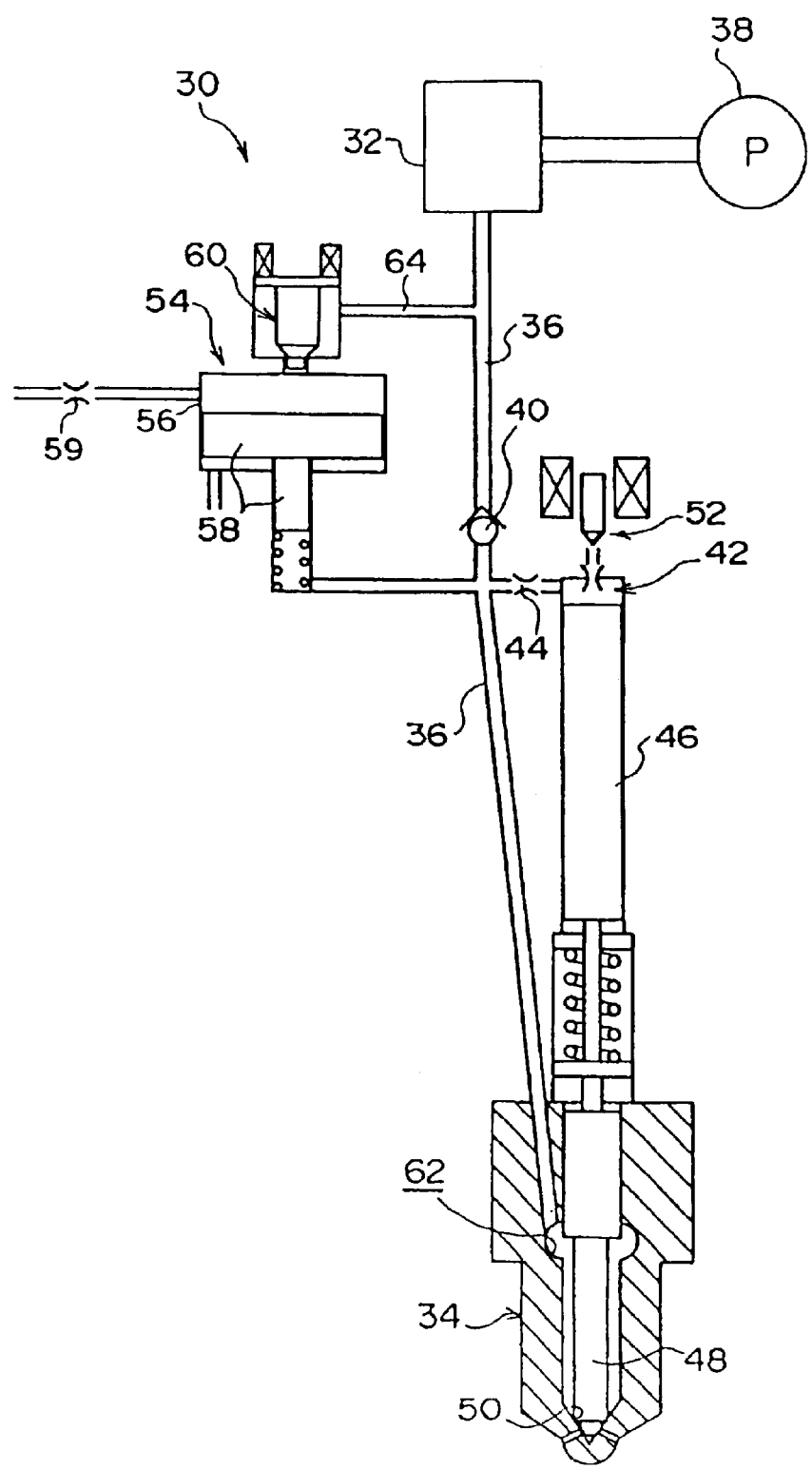
FIG. 2 is an overall structural view illustrating an example of the fuel injector according to the present embodiment.

FIG. 2 shows an overall structure of a fuel injector 30 according to an embodiment of the present invention.

The fuel injector 30 comprises an accumulator (common rail) 32. The accumulator 32 is connected to a fuel reservoir 62 in a fuel injection nozzle 34 via a main oil channel 36, and is able to accumulate fuel oil pumped from a fuel pressure pump 38 at a predetermined pressure in accordance with an engine speed or a load. Further, a pressure cutoff valve 40 is provided along the main oil channel 36 for connecting the fuel injection nozzle 34 and the accumulator 32 to each other. The pressure cutoff valve 40 prevents a fuel pressure from flowing out from the fuel injection nozzle 34 side to the accumulator 32 side.

Further, an injection control oil chamber 42 is provided at a downstream side of the pressure cutoff valve 40 of the main oil channel 36 for connecting the fuel injection nozzle 34 and the accumulator 36 to each other, and connected to the main oil channel 36 via an orifice 44. The injection control oil chamber 42 accommodates therein a command piston 46. The command piston 46 is in cooperation with a needle valve 48 in the fuel injection nozzle 34. Accordingly, due to an operation of a fuel oil pressure in the injection control oil chamber 42, the needle valve 48 in the fuel injection nozzle 34 is pressed to be seated on a nozzle seat 50, and held.

An injection control valve 52 is provided at the injection control oil chamber 42. Ordinarily, the injection control valve 52 has a structure of carrying out fuel injection by closing the needle valve 48 in the fuel injection nozzle 34 due to an operation of a fuel oil pressure in the injection control oil chamber 42 as described above or by opening the needle valve 48 due to removal of fuel oil from the injection control oil chamber 42.

An intensifier 54 is disposed at a downstream side of the pressure cutoff valve 40 of the main oil channel 36 for connecting the fuel injection nozzle 34 and the accumulator 32 to each other, and is connected to the injection control oil chamber 42. The intensifier 54 comprises a cylinder 56 and a piston 58, and has a structure of being able to, due to a movement of the piston 58, further intensify a pressure of fuel oil fed from the accumulator 32, and feed the intensified fuel oil to the injection control oil chamber 42 and the fuel injection nozzle 34.

A piston control valve 60 as intensifier control means is provided at the intensifier 54. The piston control valve 60 is provided at an oil channel 64 extending from the accumulator 32, and is structured so as to move the piston 58 by causing fuel oil fed via the oil channel 64 to flow from the accumulator 32 into the cylinder 56, thus making it possible to intensify a pressure of fuel oil at a downstream side of the pressure cutout valve 40, and also control a flow rate of fuel oil into the cylinder 56 by scaling a fuel channel area.

Further, an oil chamber corresponding to the piston 58 at a large diameter side is open to an atmosphere via an orifice 59.

Moreover, the injection control valve 52 and the piston control valve 60 are structured as being of an electromagnetic valve type or a PZT type, or a super magnetostrictive type.

Structural Example 2

Besides the above-described fundamental structure of the fuel injector 30 according to the Structural Example 1, a pressure intensifying cam can drive the intensifier 54.

Namely, the fuel injector 30 can be structured to provide the intensifier 54 with a pressure intensifying cam as a intensifier control means.

The pressure intensifying cam is structured to directly move the piston 58 of the intensifier 54, and a fuel pressure can be further increased at a downstream side of the pressure cutoff valve 40.

In this case, an immovable state of the piston 58 can be established by providing a camshaft of the pressure intensifying cam with a clutch or a mechanism of moving the camshaft upwardly. Further, a mechanism which is capable of changing a phase of the pressure intensifying cam can be added.

If the fuel injector 30 has such a pressure intensifying cam, in the intensifier 54 comprising the cylinder 56 and the piston 58, the piston 58 can be directly moved by the pressure intensifying cam to increase a fuel pressure at a downstream side of the pressure cutoff valve 40. Namely, for example, the pressure intensifying cam is rotated to synchronize with an engine speed, and during fuel injection at a common rail pressure, a state is set in which the pressure intensifying cam does not move the piston 58 by disengaging a clutch of the camshaft of the pressure intensifying cam or by moving the camshaft upwardly. On the other hand, in operating the intensifier 54, a state is set in which the pressure intensifying cam directly moves the piston 58 by engaging the clutch of the camshaft of the pressure intensifying cam or by moving the camshaft downwardly. In this way, the injector can be arranged with a simple structure.

Here, in a structure in which a fuel pressure at a downstream side of the intensifier is intensified due to an operation of the intensifier 54 all the time, fuel cannot be injected only with a common rail pressure. On the other hand, since the state can be secured in which the pressure intensifying cam does not move the piston 58 can be secured, a fuel pressure at a downstream side of the intensifier 54 can be held at a common rail pressure, and fuel injection at the common rail pressure is made possible. Consequently, in a case in which fuel is injected due to an operation of the intensifier 54, a degree of freedom at injection timing can be expanded.

[Fundamental Operation of the Injector]

The above-described fuel injector 30 comprises the accumulator 32, the pressure cutoff valve 40, the injection control oil chamber 42, the injection control valve 52, the intensifier, and the piston control valve 60. Fuel oil (at a common rail pressure) from the accumulator 32 is fed to the intensifier 54 and the piston 58 is moved to intensify the fuel oil. Further, here, regarding the fuel injection nozzle 34, an accumulator injection system (common rail injection system) is structured by "the accumulator 32, the pressure cutoff valve 40, the injection control oil chamber 42, and the injection control valve 52", and the intensifier is disposed in parallel to the accumulator injection system. In other words, regarding the fuel injection nozzle 34, an intensifier injection system jerk injection system) is structured by "the intensifier 54, the piston control valve 60, the injection control oil chamber, and the injection control valve 52".

At this point,

1) A Case of Fuel Injection by the Accumulator Injection System (Common Rail Injection System):

Before starting the injection, the injection control valve 52 is held in a closed state, and a pressure in the injection control oil chamber 42 is made equal to a pressure in the accumulator 32 (common rail pressure). Accordingly, the needle valve 48 in the fuel injection nozzle 34 is pressed to the nozzle seat 50 via the command piston 46, and held in a closed state.

In injecting fuel oil, when the piston control valve 60 is in a closed state, the intensifier 54 is put in an immovable state. Further, fuel oil from the accumulator 32 is pumped to the fuel reservoir 62 in the fuel injection nozzle 34 via the pressure cutoff valve 40. At this time, when fuel oil in the injection control oil chamber 42 is removed by opening the injection control valve 52, a pressure for closing the needle valve 48 in the fuel injection nozzle 34 decreases, while the common rail pressure is held at the inside of the fuel injection nozzle 34 (fuel reservoir 62). Accordingly, the needle valve 48 in the fuel injection nozzle 34 is opened, and the fuel oil from the accumulator 32 is injected directly (at an unchanged pressure) from the fuel injection nozzle 34.

When the fuel injection is completed, a pressure in the injection control oil chamber 42 is made equal to the common rail pressure by again opening the injection control valve 52. Therefore, the needle valve 48 in the fuel injection nozzle 34 is pressed again, via the command piston 46, in a direction the needle valve 48 closes, and then held while being seated on the nozzle seat 50. Accordingly, the fuel injection is completed.

2) A Case of Fuel Injection by the Intensifier Injection System
(Jerk Injection System):

Before starting the injection, the injection control valve 52 is held in a closed state, and a pressure in the injection control oil chamber 42 is made equal to a pressure in the accumulator 32 (common rail pressure). Accordingly, the needle valve 48 in the fuel injection nozzle 34 is pressed to the nozzle seat 50 via the command piston 46, and held in a closed state.

In injecting fuel oil, when the piston control valve 60 is opened, fuel oil is flown into the intensifier 54 (the cylinder 56). Accordingly, the piston 58 is moved to intensify a fuel pressure. Here, the fuel oil intensified by the intensifier 54 is pumped both to the fuel reservoir 62 in the fuel injection nozzle 34, and the injection control oil chamber 42. Further, in this state, the pressure cutoff valve 40 is operated to prevent the intensified fuel oil from flowing out toward the accumulator 32. Moreover, at this time, when the injection control valve 52 removes fuel oil from the injection control oil chamber 42, a pressure for closing the needle valve 48 in the fuel injection nozzle 34 decreases, while a pressure of the fuel oil intensified by the intensifier 54 is operated in the fuel injection nozzle 34 (the fuel reservoir 62). Accordingly, the needle valve 48 in the fuel injection nozzle 34 is opened, and the fuel oil intensified by the intensifier 54 is injected from the fuel injection nozzle 34.

In completing the fuel injection, a pressure in the injection control oil chamber 42 and a pressure in the fuel injection nozzle 34 are again made equal to each other by the injection control valve 52. Therefore, the needle valve 48 in the fuel injection nozzle 34 is pressed in a direction the needle valve 48 closes, and held while being seated on the nozzle seat 50, and the fuel injection is completed.

In preparing for the next injection, the piston control valve 60 of the intensifier 54 is closed to decrease a pressure within the cylinder 56 (piston room) of the intensifier 54 lower than the common rail pressure, and the piston 58 is again moved to its original position. In accordance with this, when a fuel pressure at a downstream side of the pressure cutoff valve 40 becomes less than the common rail pressure, the pressure cutoff valve 40 is immediately opened, and imparts substantially the same fuel pressure as the common rail pressure.

Thus, in the fuel injector 30 according to the present embodiment, fuel injection can be controlled by switching to a low pressure injection for feeding fuel oil fed unchanged from the accumulator 32 to the fuel injection nozzle 34 and injecting the fuel oil or a high pressure injection for feeding fuel oil further pressurized by the intensifier 54 to the fuel injection nozzle 34 and injecting the fuel oil. Accordingly, the fuel injector 30 fundamentally exhibits the following effects:

① Since fuel (at a common rail pressure) fed from the accumulator 32 to the intensifier 54 is intensified and injected, a super high injection pressure (for example, a maximum injection pressure of 300 Mpa) which largely exceeds that of a conventional common rail injection system can be realized. Accordingly, even when an engine speed is high and a load is high, fuel can be injected during an appropriate injection period, a fuel injection rate is further made higher, and excellent combustion is enabled, and a low emission and high power engine can be realized.

Further, deterioration of a spray complete penetration performance due to a reduction of an opening diameter of the fuel injection nozzle can be compensated by a super high injection pressure. Since oxygen within a combustion room can be used effectively, an excellent combustible state in which occurrence of smokes is minimized can be realized.

Moreover, there is no need for a constant accumulation of a super high injection pressure therein, and from a viewpoint of a rigidity as an injector, the injector 30 of the present invention is more advantageous than a conventional common rail injection system that requires a constant accumulation of a predetermined high injection pressure therein, and can also decrease a manufacturing cost.

② The accumulator injection system (common rail injection system) and the intensifier are disposed in parallel to each other. When a fuel pressure at a downstream side of the pressure cutoff valve is below a common rail pressure, fuel is supplied from the accumulator. Therefore, when an after injection is carried out after a main injection, fuel is not injected at a pressure lower than the common rail pressure. Accordingly, since spray can be after-injected in an excellent atomized state, the after-injected fuel itself cannot be a cause to generate smokes. Consequently, a combustion promoting effect can be exhibited to the maximum by the after-injected fuel stirring a combustion place or by raising a temperature of the combustion place.

Further, since fuel injection can be controlled by switching to a low-pressure injection or a high-pressure injection, an optimal injection pressure can be set for the pilot injection, the main injection and the after injection, respectively.

Moreover, an injection at a common rail pressure and an injection due to an operation of the intensifier 54 can be freely combined to perform fuel injection, whereby a degree of freedom of injection pattern is large.

③ Since the accumulator injection system (common rail injection system) and the intensifier 54 are disposed in parallel to each other, and when a fuel pressure at a downstream side of the pressure cutoff valve 40 is below a common rail pressure, fuel is supplied from the accumulator 32, injection pressure cannot be lower than a vapor pressure of fuel. Accordingly, there is no need to worry about formation of erosion on the oil channel due to an occurrence of cavitation, whereby durability is remarkably increased.

④ Since the accumulator injection system (common rail injection system) and the intensifier 54 are disposed in parallel to each other, even if the intensifier 54 is out of order in a state in which the accumulator 32 and the intensifier 54 are disconnected from each other, fuel can be injected at a common rail pressure. Consequently, there is no possibility for an engine to stop suddenly.

The fuel injector according to the above-described Structural Example 2 in which the intensifier 54 is driven by the pressure intensifying cam can also exhibit substantially the same operations and effects as those in the fuel injector 30.

Here, as shown in FIG. 2, an example has been explained in which the intensifier 54 is operated by causing fuel oil to flow into the intensifier 54. However, as shown in FIG. 3, it is also possible to operate the intensifier 54 by causing fuel oil to flow out of the intensifier 54.

Figure 3:
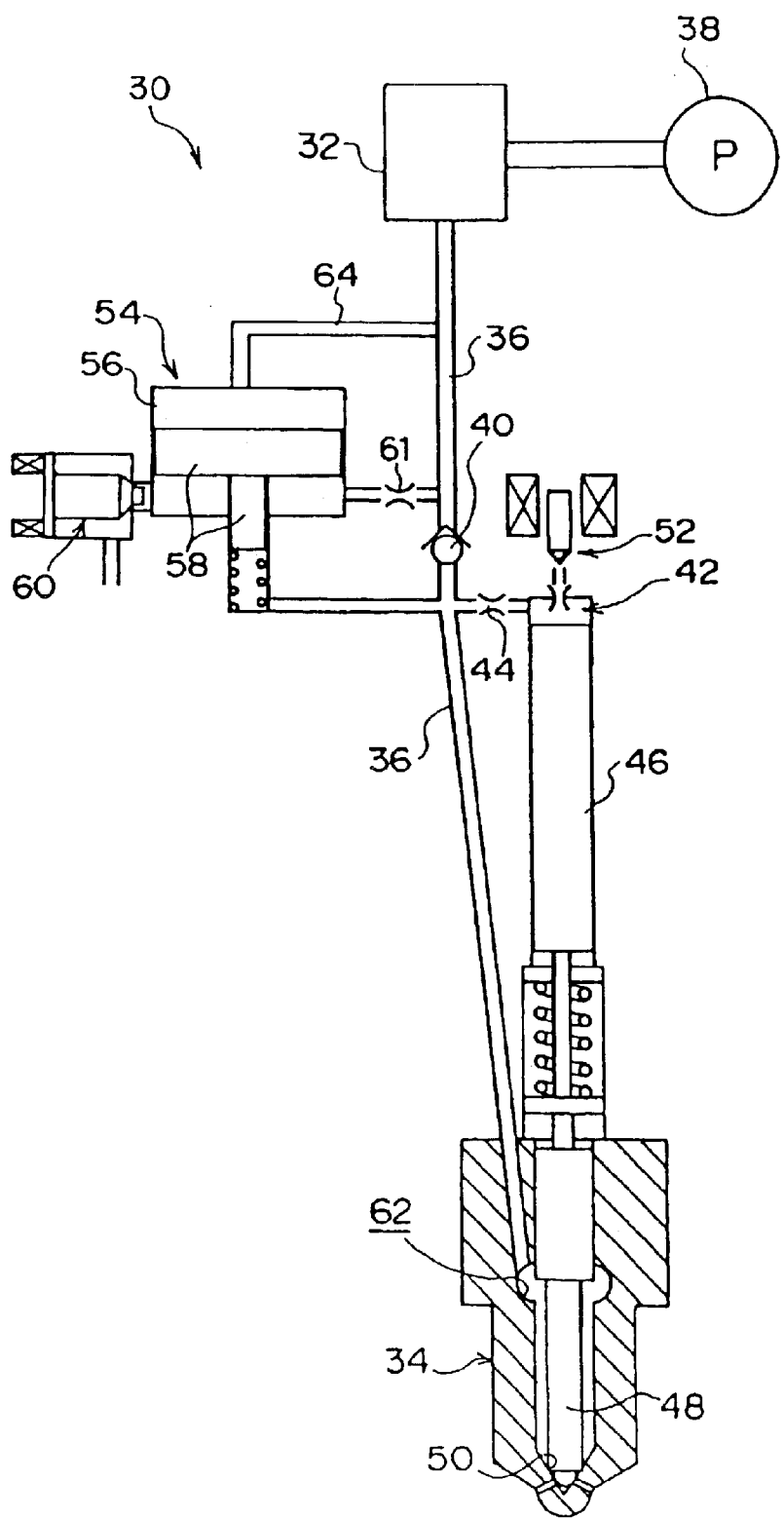
FIG. 3 is an overall structural view illustrating an example of the fuel injector according to the present embodiment.

FIG. 2 and FIG. 3 schematically show the piston control valve 60 as a two-way valve. It is also advantageous to form the piston control valve 60 into a three-way valve together with an orifice 59 as shown in an example of FIG. 2, and with an orifice 61 as shown in an example of FIG. 3 in order to reduce a fuel amount for the operation of an injector. Further, as the injection control valve 52 is illustrated as a two-way valve, it can also be formed into a three-way valve. Further, the needle valve 48 in the fuel injection nozzle 34 and the injection control oil chamber 42 are connected to each other via the command piston 46. However, even when the present invention is structured without the command piston 46, since a similar operational principle can be obtained, such structure can be adopted.

[Fuel Injection Method]

A. Fundamental Characteristics for Explaining Fuel Injection

First, a description will be made of fundamental characteristics during fuel injection when fuel is injected at a common rail pressure in the above-described fuel injector 30.

Figure 4:
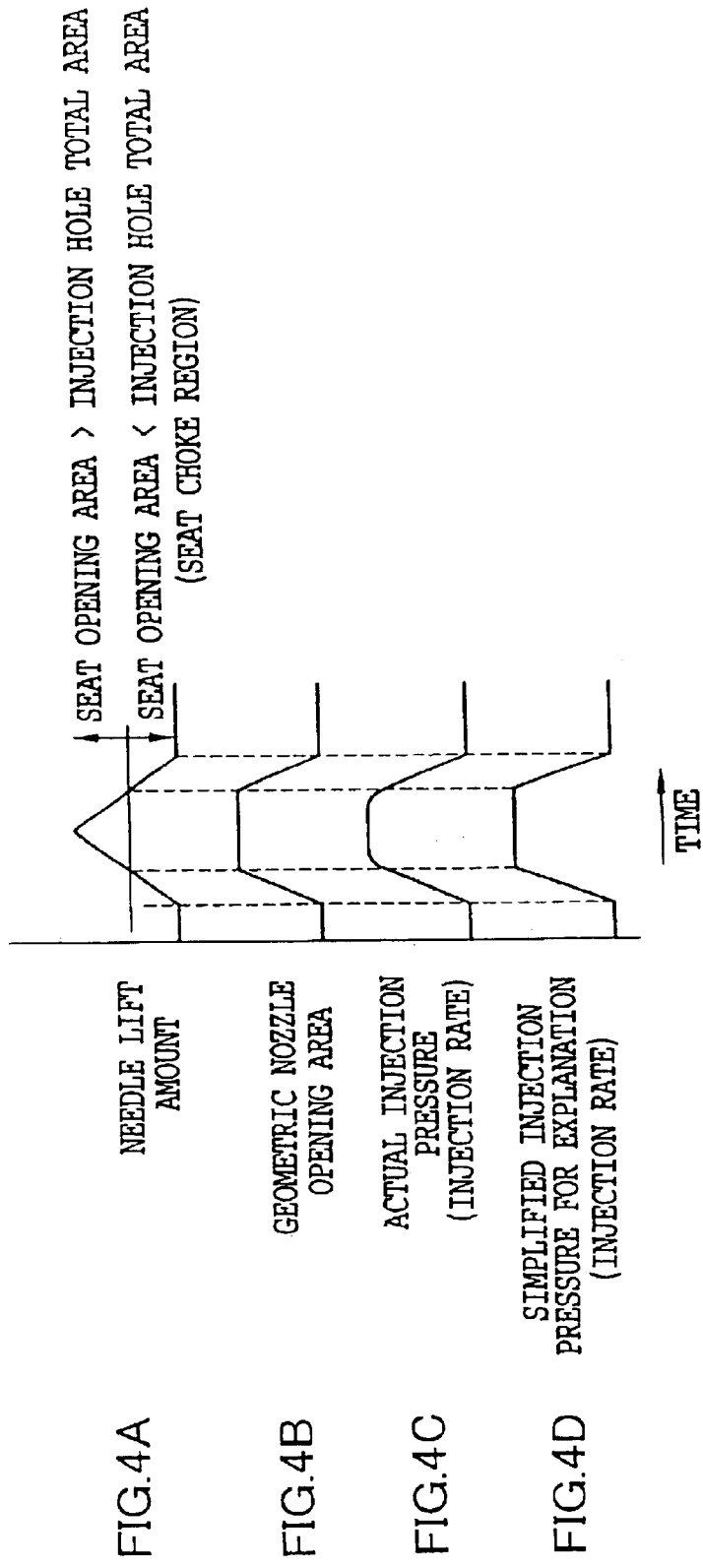
FIG. 4A is a diagram illustrating a change with time of a moving rate (lift amount) of a needle valve for explaining fundamental characteristics during fuel injection at a common rail pressure in the fuel injector according to the present embodiment.
FIG. 4B is a diagram illustrating a change with time of a geometric nozzle opening area for explaining fundamental characteristics during fuel injection at a common rail pressure in the fuel injector according to the present embodiment.
FIG. 4C is a diagram illustrating changes with time of an actual injection pressure and an injection rate for explaining fundamental characteristics during fuel injection at a common rail pressure in the fuel injector according to the present embodiment.
FIG. 4D is a schematic diagram illustrating changes with time of an injection pressure and an injection rate for explaining fundamental characteristics during fuel injection at a common rail pressure in the fuel injector according to the present embodiment.

Further, in an accumulator injection system (common rail injection system) using a "two-way valve" as an injection control valve such as the injection control valve 52 of the present embodiment, as shown in FIG. 4A, generally, the needle valve 48 in the fuel injection nozzle 34 opens/closes at a moving rate (lift speed) that is comparatively low, and there exists a seat choke region (in which a substantial opening area of the nozzle seat 50 is smaller than a total area of a nozzle injection hole). On the other hand, an effective opening area for injecting fuel by the fuel injection nozzle does not gradually become larger or does not gradually become smaller in accordance with a movement of the needle valve 48. As shown in FIG. 4B, a maximum area that is limited by a total area of a nozzle injection hole is secured for the most period of time. However, as shown in FIG. 4C, actually, time when both an injection pressure and an injection rate become maximal will be slightly slower than time when a geometric nozzle opening area becomes maximal. This is because, while the nozzle seat 50 portion is opened along the entire circumference of a needle (the opening area of the nozzle seat 50 portion corresponds to the entire circumference of a needle), the number of nozzle injection holes is limited, which does not allow the opening area of the nozzle seat 50 portion to be used effectively. The same description can be made on time when fuel injection is completed.

In order to clarify the description, as shown in FIG. 4D, a description of the present embodiment will be made on the assumption that an injection pressure and an injection rate depend on a geometric opening area of a nozzle seat portion (hereinafter, "nozzle opening area").

Next, a description will be made of a pressure change directly before the nozzle seat 50 portion when fuel is injected by an intensifier injection system jerk injection system).

Figure 5:
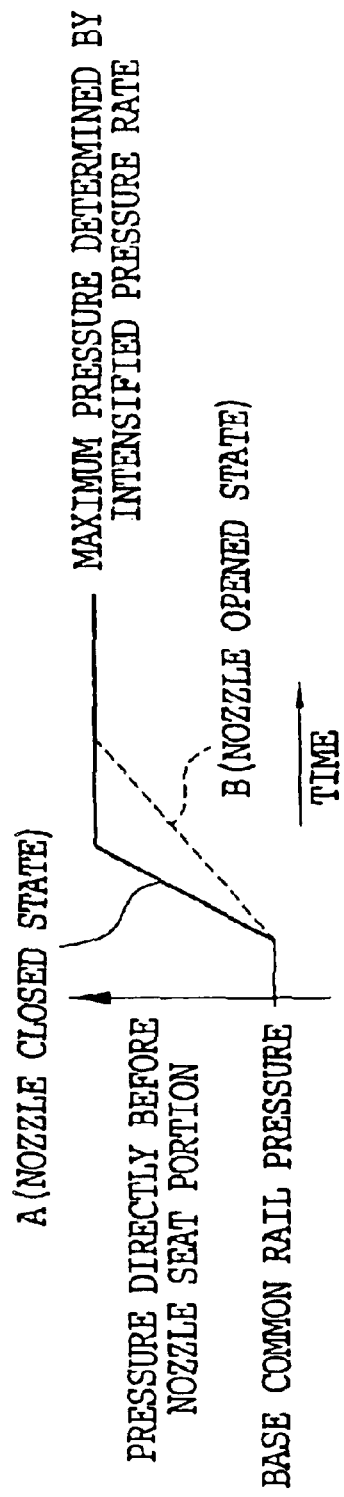
FIG. 5 is a diagram for explaining a change of pressure change directly before a nozzle seat portion when fuel is injected by an intensifier injection system (jerk type injection system) in the fuel injector according to the present embodiment.

As shown in FIG. 5, when the fuel injection nozzle 34 (the needle valve 48) is opened, during an intensifier of a pressure, fuel is flown out due to an injection thereby causing a rising rate of a pressure to decrease. In this case, an inclination (rising rate) of a pressure increments 1 when the fuel injection nozzle 34 is closed in relation to a base common rail pressure (rising rate), and also increments 1 when the fuel injection nozzle 34 is opened in relation to the base common rail pressure (rising rate). Further, if a base common rail pressure is changed, the inclination (rising rate) also change.

In a case in which fuel injection is started or stopped during an operation of the intensifier 54 (piston 58), a rising rate of an actual injection pressure continuously changes in accordance with a continuous change of the nozzle opening area.

However, in order to clarify the description, a description of the present embodiment will be made on the assumption that a pressure rising rate is low during fuel injection, and a pressure rising rate is high during a suspension of fuel injection.

B. A Method by "Controlling an Operational Phase Difference Between Valves"

1. Setting of Preferable Conditions

Figure 6:
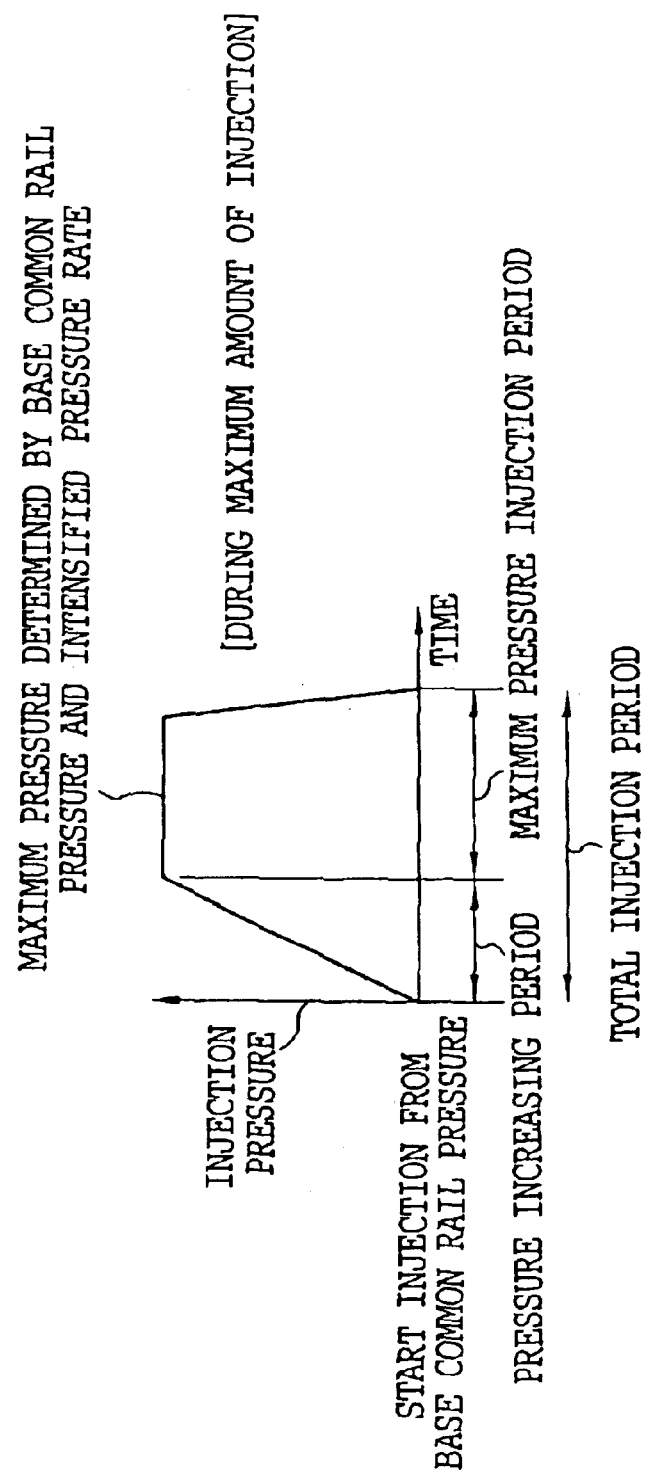
FIG. 6 is a diagram for explaining a setting of suitable conditions when fuel is injected by a method of "controlling a phase difference due to an operation of valves" among fuel injection methods in the fuel injector according to the present embodiment.

In a so-called injection rate control for changing an injection pressure during an injection, in order to obtain superior effects, as shown in FIG. 6, when fuel is injected by the fuel injection nozzle 34 in a maximum amount as needed by an engine, it is preferable to set a pressure increasing period of fuel injected from the fuel injection nozzle so as to occupy ⅓ or more of the entire injection period. Accordingly, even when fuel injection is performed with an arbitrary injection pattern by "controlling an operational phase difference between valves", it is preferable to set the pressure increasing period as described above.

This can suitably control fuel injection with an arbitrary injection pattern (for example, a maximum injection pressure of fuel injected from a fuel injection nozzle, a rate of increase of the injection pressure at the start of an increase of pressure, a rate of decrease of the injection pressure at the completion of injection, a pilot injection pressure, an after injection pressure and the like).

2. Control of a Maximum Injection Pressure and a Rate of Increase of the Injection Pressure at the Start of an Increase of Pressure A timing to open the needle valve 48 (a timing to operate the injection control valve 52) and a timing to operate the intensifier 54 (a timing to operate the piston control valve 60) are individually controlled, and an operational phase difference between the control valves 52 and 60 is regulated, whereby fuel injection can be performed with an arbitrary fuel injection pattern.

FIGS. 7A to 7D show an example of a fuel injection pattern in which a maximum injection pressure and a rate of increase of an injection pressure are arbitrarily set by changing an operational phase difference between the injection control valve 52 and the piston control valve 60.

As shown in FIG. 7A to FIG. 7D, when a nozzle opening area becomes maximal (when a seat choke period was completed), an injection pressure rapidly increases to be the same as that directly before the nozzle seat 50 portion. Thereafter, when the fuel injection is competed, a pressure decreased during the period of the seat choke. Accordingly, by suitably controlling an operational phase difference (operational timing) between the injection control valve 52, the piston control valve 60 can be arbitrarily chosen, whereby it becomes possible to change a maximum injection pressure, and a rate of increase of the injection pressure at the initial state of an increase of a pressure.

Figure 7:
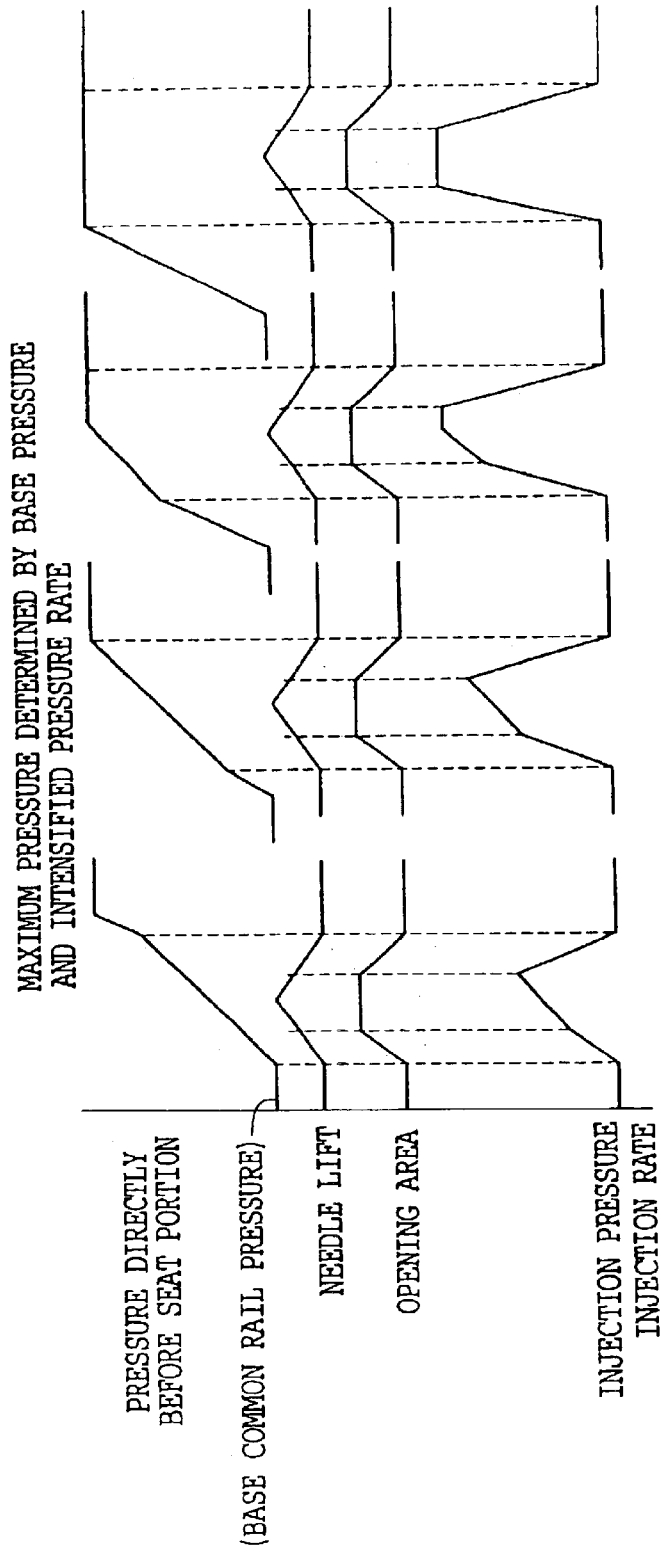
FIG. 7A is a diagram illustrating an example of a fuel injection pattern in which a maximum injection pressure and a rate of increase of an injection pressure are arbitrarily set by the method of "controlling an operational phase difference between valves" among fuel injection methods in the fuel injector according to the present embodiment.
FIG. 7B is a diagram illustrating an example of a fuel injection pattern in which a maximum injection pressure and a rate of increase of an injection pressure are arbitrarily set by the method of "controlling an operational phase difference between valves" among fuel injection methods in the fuel injector according to the present embodiment.
FIG. 7C is a diagram illustrating an example of a fuel injection pattern in which a maximum injection pressure and a rate of increase of an injection pressure are arbitrarily set by the method of "controlling an operational phase difference between valves" among fuel injection methods in the fuel injector according to the present embodiment.
FIG. 7D is a diagram illustrating an example of a fuel injection pattern in which a maximum injection pressure and a rate of increase of an injection pressure are arbitrarily set by the method of "controlling an operational phase difference between valves" among fuel injection methods in the fuel injector according to the present embodiment.

Particularly in this case, as shown in FIGS. 7B and 7C, a rate of increase of an injection pressure can be arbitrarily chosen by starting fuel injection when a pressure directly before the nozzle seat 50 portion is an arbitrary pressure between a base common rail pressure and a maximum injection pressure statically determined by an intensified pressure ratio of the intensifier 54. Further, as shown by comparing FIG. 7C and FIG. 7D, if the base common rail pressure and the maximum injection pressure are the same, a rate of increase of the injection pressure can also be changed.

In FIGS. 7A to 7D, cases are shown in which fuel is injected for the same injection period of time. In order for each of the cases to have the same fuel injection amount, it is necessary to shorten an operation time of the injection control valve 52 and an injection period as well, from the pattern in FIG. 7A to the pattern in FIG. 7D. However, also in that case, it is a matter of fact that, due to an operational phase difference between valves, a rate of increase of an injection pressure and a maximum injection pressure can be controlled as described above.

As described above, by appropriately controlling and regulating an operational phase difference (operational timing) between the injection control valve 52 and the piston control valve 60, a rate of increase of an injection pressure and a maximum injection pressure can arbitrarily be set, and a degree of freedom of injection can be further expanded.

In controlling a phase difference between the two control valves described above, a rate of increase of an injection pressure changes in association with a maximum injection pressure. Namely, the higher the pressure at the start of the injection, the higher the rate of increase of the injection pressure. The above-described description has been made by simplification of an injection pressure by being corresponded to a geometric nozzle opening area. As described above, an actual changing point of a pressure does not exactly correspond to a geometric seat choke period. However, this does not make any substantial difference for explaining the method according to the present embodiment.

Figure 8:
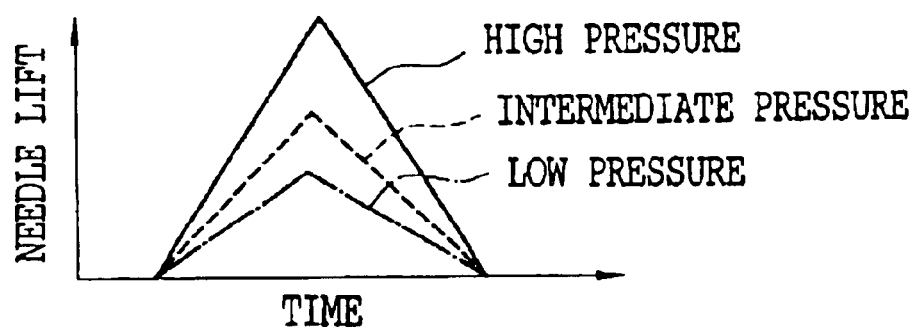
FIG. 8 is a diagram for explaining a case in which needle lift characteristics of the needle valve of the fuel injection nozzle depend on a pressure.

In FIGS. 7A to 7D described above, it is assumed that characteristics (needle lift characteristics) of the fuel injection nozzle 34 (needle valve 48) do not depend on a pressure. However, for example, a common rail injector comprising a two-way valve injection control valve and a command piston, as shown in FIG. 8, has features that the higher the pressure, the higher the needle speed both at an opening time and at a closing time of the needle valve.

In the injector (fuel injection nozzle) having the characteristics in which the higher the needle lift speed, the higher the pressure, the higher the pressure at the start of the injection, the higher the needle lift speed, whereby, the seat choke period is gone through very quickly. Accordingly, in fuel injection (fuel injection nozzle) having characteristics in that the higher the pressure, the higher the needle lift speed, as the pressure at the start of the injection increases, the needle lift speed becomes higher. Therefore, the seat choke period is gone through very quickly. Consequently, if the rate of decrease of the pressure is controlled by considering this needle lift characteristics, a control effect can be exhibited more effectively in which the rate of decrease of the injection pressure can be controlled due to a control of an operational phase difference between the injection control valve 52 and the piston control valve 60.

3. Control of a Rate of Decrease of the Injection Pressure at the Completion of an Injection An example of a fuel injection pattern is shown FIGS. 9A to 9C in which a maximum injection pressure and a rate of decrease of an injection pressure are arbitrarily set, due to a change of an operational phase difference between the injection control valve 52 and the piston control valve 60, more specifically, such that an operation of the piston control valve 60 is stopped before the complete closure of the needle valve 48 in the fuel injection nozzle 34 to thereby stop the intensifier 54.

As shown in FIGS. 9A to 9C, the intensifier 54 is stopped during the opening time of the needle valve 48 (needle lift period), and an injection pressure of fuel injected from the fuel injection nozzle 34 can be decreased to a base common rail pressure at the lowest. Namely, as compared to a case in which the intensifier 54 is operated fully (in a case of FIG. 9A), as shown in FIG. 9B or FIG. 9C, a rate of decrease of the injection pressure at the completion of the injection can be made higher.

In FIGS. 9A to 9C, cases are shown in which fuel is injected for the same injection period of time. Both patterns in FIG. 9A and FIG. 9C have substantially the same fuel injection amount. However, the pattern of FIG. 9B has fewer fuel injection amount than that of the FIG. 9C. In order for the pattern in FIG. 9B to have the same amount as those of the patterns in FIG. 9A and FIG. 9C, it is necessary to prolong the injection period by extending an operation of the injection control valve 52. However, in that case, it is a matter of fact that a rate of decrease of an injection pressure can be controlled by an operational phase difference of the control valves as described above.

As described above, due to an appropriate control/regulation of an operational phase difference (operational timing) between the injection control valve 52 and the piston control valve 60, a rate of decrease of the injection pressure when an injection was competed can arbitrarily be set thus making it possible to increase a degree of freedom of injection.

In controlling a phase difference between the aforementioned two valves (in stopping an operation of the intensifier 54 during a needle lift period of the needle valve 48), a rate of decrease of an injection pressure can be controlled independently of a maximum injection pressure. Further, by controlling the rate of decrease of the injection pressure in combination with (using together) "1. A control of a maximum injection pressure, a rate of increase of the injection pressure at the start of intensifying pressure", as in the patterns shown in FIGS. 9A and 9C, for example, the injection amount and the maximum injection pressure are the same, a rate of decrease of a pressure can be changed (can be set differently).

The above description has been simply made by associating an injection pressure with a geometric nozzle opening area. As described above, an actual changing point of a pressure is not exactly coincident with a geometric seat choke period. However, it does not make any difference in explaining an essential control method.

In FIGS. 9A to 9C described above, it has been explained that characteristics (needle lift characteristics of the fuel injection nozzle 34 (needle valve 48) does not depend on a pressure. However, for example, a common rail injector having a two-way valve injection control valve and a command piston, as shown in FIG. 8 described above, has characteristics in that the higher the pressure, the higher the needle speed both at an opening time and a closing time of the needle valve.

In fuel injection (fuel injection nozzle) having characteristics in that the higher the pressure, the higher the needle lift speed, as the pressure at the start of the injection increases, the needle lift speed becomes higher, whereby the seat choke period is gone through very quickly. Consequently, if the rate of decrease of the pressure is controlled by considering this needle lift characteristics, a control effect can be exhibited more effectively in which the rate of decrease of the injection pressure at the completion of the injection is controlled due to a control of an operational phase difference between the injection control valve 52 and the piston control valve 60. And also, if the fuel pressure is low, an opening/closing speed of the needle valve 48 becomes slower, thus making a fuel injection period longer. Accordingly, even when a timing at which an operation of the intensifier 54 is slightly changed, the injector operates so as to keep an injection amount substantially uniform, whereby an effect can be exhibited in that a variation of an injection amount can be reduced.

4. Control of After Injection Pressure (Pilot Injection Pressure)

FIGS. 10A to 10D show an example of a fuel injection pattern in which an operational phase difference between the injection control valve 52 and the piston control valve 60 is varied, more specifically, before starting an after injection, the piston control valve 60 is operated, the intensifier 54 is stopped, and an after injection pressure is arbitrarily set.

As shown in FIGS. 10A to 10D, in performing an after injection, before starting an after injection, the piston valve 60 is operated, the intensifier is stopped, and an after injection can be performed at an arbitrary intermediate pressure between a base common rail pressure, and a maximum injection pressure determined by an operation (intensified pressure ratio) of the intensifier 54.

Here, for example, if fuel injection is simply carried out only by two pressures including a predetermined pressure (base common rail pressure) of fuel oil by the accumulator and a static maximum injection pressure due to an operation of the intensifier, it can be considered that an after injection is carried out at a high injection pressure at short intervals after a main injection in order to reduce soot (carbon and the like) or an after injection is carried out at a low injection pressure in order to conduct an after-treatment of exhaust gas. However, as described above, if the after injection is carried out at a high injection pressure at short intervals after the main injection, when the injection pressure is too high, it causes $NO_x$ or combustion noise to increase. Namely, it is not a good idea to carry out the after injection at a high injection pressure only by focusing a reduction of soot (carbons and the like), but it should be noted that an optimal pressure is existent for the injection pressure. On the other hand, when the after injection is carried out to conduct the after-treatment of exhaust gas, if the injection pressure is too low, a problem is caused in that soot or PM (particulate matters) increases due to a deterioration of spray atomization. Further, if the injection pressure is too high, fuel is deposited on a wall surface of the engine thereby causing a problem in that a piston ring is secured or oil is diluted, leading to a deterioration of emission of the engine. In other words, even when the after injection is carried out to conduct the after-treatment of exhaust gas, an optimal pressure is existent for the injection pressure. In this way, when the fuel injection is carried out merely by two pressures comprising a base common rail pressure) and a static maximum pressure, an optimal fuel injection cannot be performed so as to satisfy all of the fuel injection patterns.

In this respect, in "3. Control of after injection pressure" of the present invention, in carrying out an after injection, before starting the after injection, the intensifier 54 is stopped, and the after injection is performed at an intermediate pressure between a base common rail pressure and a static maximum pressure. Accordingly, the suspension period of the intensifier 54 is regulated (controlled), whereby the after injection can be performed at an arbitrary optimal injection pressure enough to entirely satisfy fuel injection patterns.

When a multi-stage injection is performed in which fuel injection from the fuel injection nozzle is carried out in a plurality of times per 1 cycle engine, the intensifier is operated at least two or more times, and a degree of freedom of an injection pattern can be further increased.

5. Summary of a Method of "Controlling an Operational Phase Difference Between Valves"

In the fuel injecting method by "controlling an operational phase difference between valves" as described above, an opening timing of the needle valve 48 (operational timing of the injection control valve 52) and an operational timing of the intensifier 54 (operational timing of the piston control valve 60) are individually controlled (an operational phase difference for each control valve is controlled), and fuel injection can be performed with an arbitrary fuel injection pattern.

Namely, in performing fuel injection, an injection pressure of fuel injected from the fuel injection nozzle 34 and a fuel injection pattern in accordance with the injection rate (for example, an optimal fuel pressure or an optimal injection rate of a pilot injection or a main injection in accordance with an engine speed or a load condition) are predetermined. When the needle valve 48 is opened and fuel injection is started, an opening timing of the needle valve 48 and an operation timing of the intensifier 54 are determined (operational phase difference is regulated) to form the predetermined fuel injection pattern by controlling a fuel pressure by the accumulator 32 and a fuel rising pressure by operating the intensifier 54. Thereafter, operations of the injection control valve 52 and the piston control valve 60 at the determined timings are respectively controlled, and fuel injection is performed along with the predetermined pattern.

Figure 1:
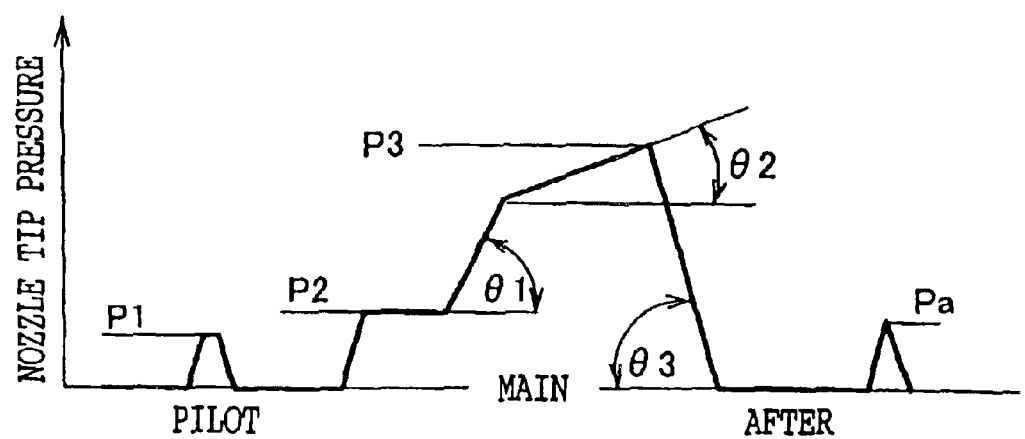
FIG. 1 is a diagram illustrating a representative example of an arbitrary fuel injection pattern which can be carried out by an fuel injection method in an fuel injector according to an embodiment of the present invention.

Consequently, in accordance with the fuel injection method of the present invention, as in the fuel injection pattern illustrated in FIG. 1, when a multi-injection is performed in which a pilot injection, a main injection and an after injection are carried out, a pilot injection pressure ($P_1$), a main boot injection pressure ($P_2$), a main injection maximum pressure ($P_3$), an after injection pressure ($P_a$), a pressure rising rate after a completion of a boot injection period ($\theta 1$), a pressure rising rate directly before reaching a maximum injection pressure ($\theta 2$), and a pressure drop rate at the completion of a main injection ($\theta 3$) can be controlled freely (determined or selected and performed).

Figure 11A:
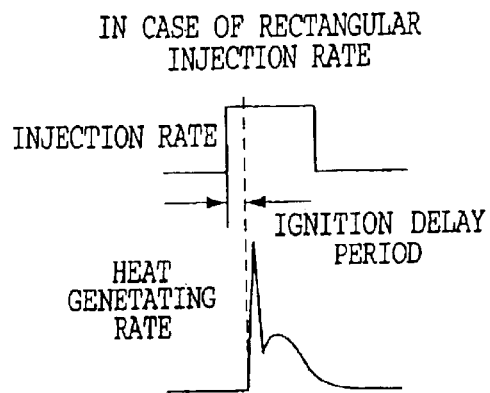
FIG. 11A is a diagram illustrating an influence on exhaust gas and combustion noise, exerted by a fuel injection method in a conventional fuel injector.

By this, in accordance with the fuel injecting method of the present invention can exhibit the following effects:

① Generally, as shown in FIG. 11A, a diesel combustion needs some time (ignition delay period) from the start of fuel injection to an ignition. When a fuel injection pattern is a rectangular injection rate formed by an accumulator injection system (common rail injection system), a large quantity of fuel is injected during the ignition delay period, and this large quantity of fuel which was injected during the ignition delay period is burnt at one time thus causing $No_x$ and noise to increase.

Figure 11B:
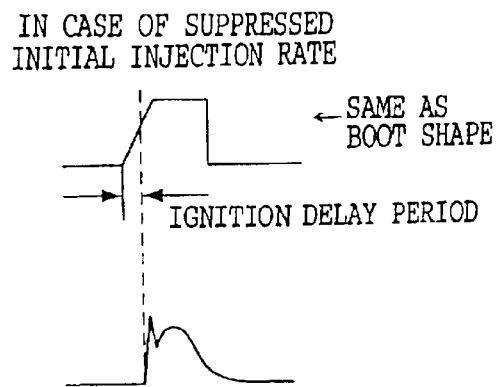
FIG. 11B is a diagram illustrating an effect on exhaust gas and combustion noise, exerted by the fuel injection method in the fuel injector according to the present embodiment.

Meanwhile, as shown in FIG. 11B, when a fuel injection pattern whose initial injection rate has been suppressed is formed by controlling an initial injection rate by the fuel injecting method, excellent combustion can be obtained in which $No_x$ and noise are low.

Figure 12A:
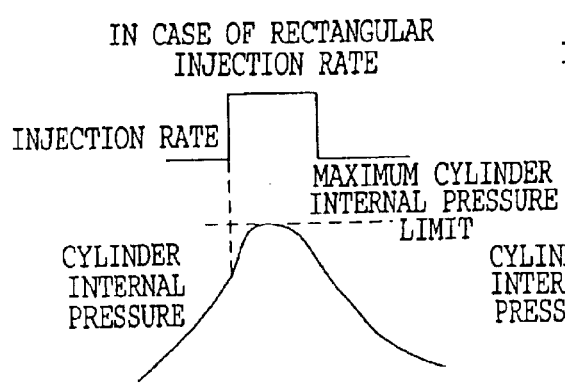
FIG. 12A is a diagram illustrating an influence on an output, exerted by the fuel injection method in the conventional fuel injector.

② the fuel injection period and the fuel injection amount are limited by a maximum cylinder internal pressure in order secure a strength of an engine under the entire load condition of an engine. Here, in a case in which the fuel injection pattern is a rectangular injection rate by an accumulator injection system (common rail injection system), as shown in FIG. 12A, an initial combustion amount is large, whereby injection timing cannot be preceded.

Figure 12B:
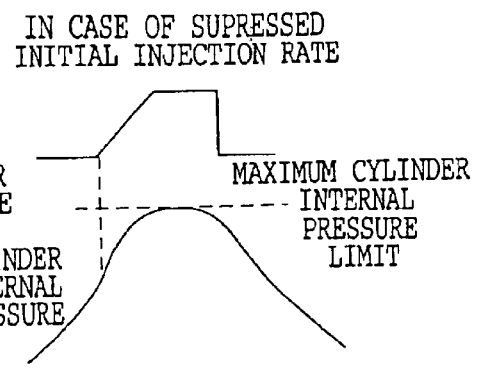
FIG. 12B is a diagram illustrating an effect on the output, exerted by the fuel injection method in the fuel injector according to the present embodiment.
Figure 13A:
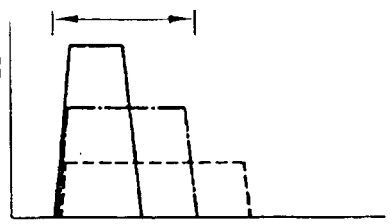
FIG. 13A is a diagram illustrating an example in which a fuel injection rate is set by a method of "controlling a piston moving rate by an intensifier (changing an area of a fuel channel)" among fuel injection methods in the fuel injector according to the present embodiment, and a pattern for changing a pressure rising rate after a completion of a boot injection period ($\theta 1$)
Figure 13B:
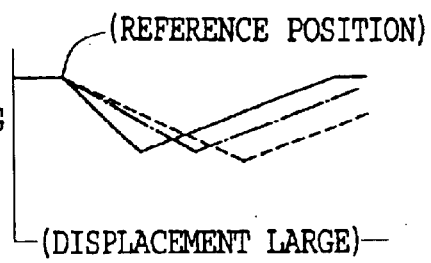
FIG. 13B is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure rising rate after a completion of a boot injection period ($\theta 1$)
Figure 13C:
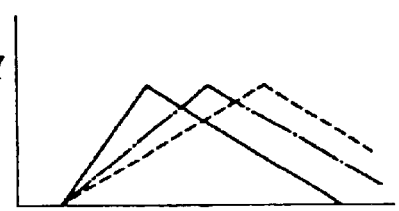
FIG. 13C is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure rising rate after a completion of a boot injection period ($\theta 1$)
Figure 13D:
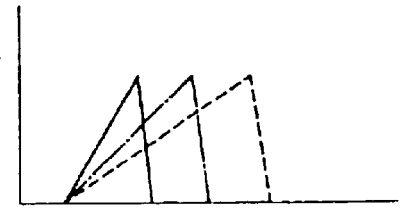
FIG. 13D is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure rising rate after a completion of a boot injection period ($\theta 1$)
Figure 14A:
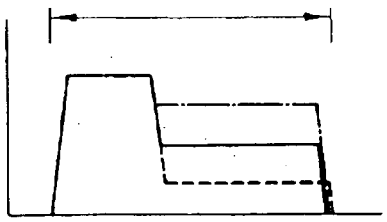
FIG. 14A is a diagram illustrating an example in which a fuel injection rate is set by a method of "controlling a piston moving rate by an intensifier (changing an area of a fuel channel)" among fuel injection methods in the fuel injector according to the present embodiment, and a pattern for changing a pressure rising rate directly before reaching a maximum injection pressure ($\theta 2$)
Figure 14B:
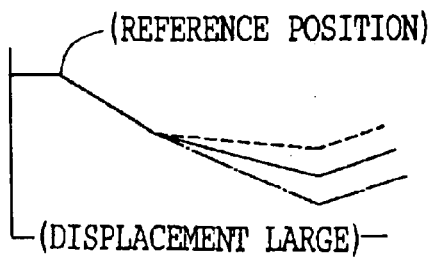
FIG. 14B is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure rising rate directly before reaching a maximum injection pressure ($\theta 2$)
Figure 14C:
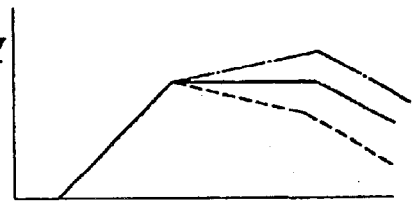
FIG. 14C is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure rising rate directly before reaching a maximum injection pressure ($\theta 2$)
Figure 14D:
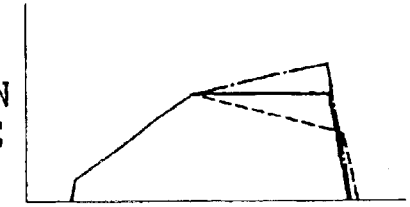
FIG. 14D is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure rising rate directly before reaching a maximum injection pressure ($\theta 2$)
Figure 15A:
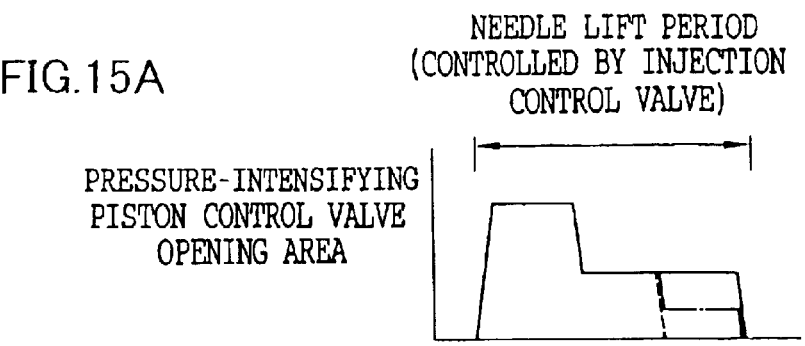
FIG. 15A is a diagram illustrating an example in which a fuel injection rate is set by a method of "controlling a piston moving rate by an intensifier (changing an area of a fuel channel)" among fuel injection methods in the fuel injector according to the present embodiment, and a pattern for changing a pressure drop rate at a completion of a main injection ($\theta 3$)
Figure 15B:
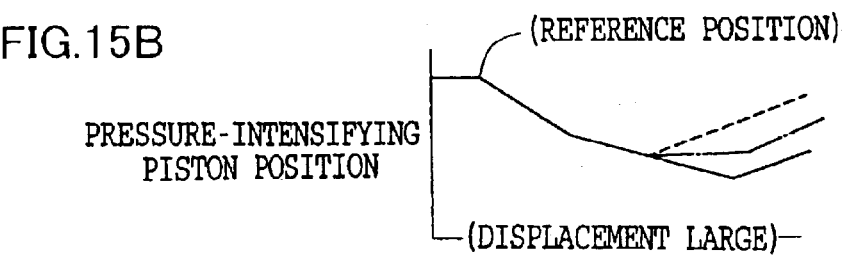
FIG. 15B is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure drop rate at a completion of a main injection ($\theta 3$)
Figure 15C:
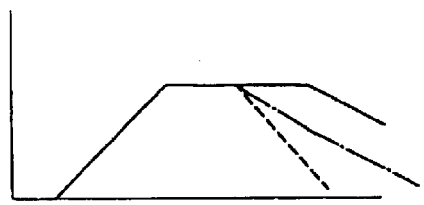
FIG. 15C is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure drop rate at a completion of a main injection ($\theta 3$)
Figure 15D:
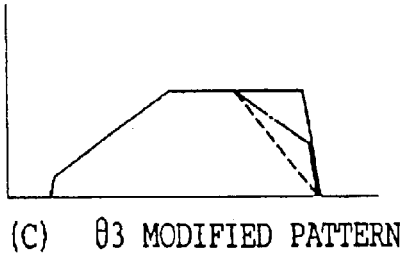
FIG. 15D is a diagram illustrating an example in which a fuel injection rate is set by the method of "controlling a piston moving rate by an intensifier (changing an area of a fuel channel)" among fuel injection methods in the fuel injector according to the present embodiment, and a pattern for changing a pressure drop rate at a completion of a main injection ($\theta 3$)

On the other hand, as shown in FIG. 12B, a fuel injection patter whose initial injection rate has been suppressed is formed by controlling the initial injection rate by the fuel injecting method, the injection timing can be preceded, and a large amount of fuel can be injected, a high torque can be secured. Further, at this time, $No_x$ and noise can be reduced.

③ When a multi-injection is carried out by ordinary accumulator injection system (common rail injection system), respective injections (such as a pilot injection, a main injection, an after injection and a post injection and the like) can be carried out at the same pressure. However, actually, optimal pressure can be provided for respective injections. In fuel injection by the fuel injection method of the present invention, when a multi-injection is carried out, respective injections can be made optimal, and exhaust characteristics can improve and noise can be reduced.

For example, when a pressure during the pilot injection is too high, problems such as an increase of non-combusted HC due to a deposition of fuel onto a wall surface and an oil dilution are caused. Further, since controllability at the time when a slight amount of fuel is injected is bad, a problem is caused in that a pilot combustion is large, and a sufficient effect about a noise reduction cannot be exhibited. Conversely, when a pressure during the pilot injection is too low, a problem is caused in that noise reduction effect decreases due to deterioration of atomization and smokes increase.

C. A Method of "Controlling a Piston Moving Rate by an Intensifier"

1. Control of a Rate of Increase of the Injection Pressure at the Start of Pressure Intensification and a Rate of Decrease of the Injection Pressure at the Completion of the Injection Pressure In the fuel injector 30 described above, fuel can be injected at an arbitrary pressure from low to high, an optimal injection pressure can be set respectively at a pilot injection, a main injection, and an after injection. Besides, fuel can be injected by freely combining an injection at a common rail pressure and an injection due to an operation of the intensifier 54. And fuel can be injected along with an arbitrary injection pattern. However, a flow rate of fuel oil into the cylinder 56 can be controlled by the piston control valve 60 changing an area of a fuel channel (substantial opening area of a channel), whereby an injection rate of fuel injected from the fuel injection nozzle 34 can be determined (changed) arbitrarily.

Here, in order to perform fuel injection with an injection pattern having an arbitrary injection rate, a fuel injection pattern on the basis of an injection rate of fuel injected from the fuel injection nozzle 34 (for example, an optimal fuel injection rate of a pilot injection or a main injection in accordance with an engine speed or a load state) is preset. Then, an area of a fuel channel into the cylinder 56 due to the piston control valve 60 is determined so as to have the preset fuel injection rate (pattern) when the needle valve 48 is opened to carry out an fuel injection. Thereafter, fuel injection is performed at the set injection rate by controlling an operation of the piston control valve 60 on the basis of the fuel channel area thus determined (a moving amount and a moving timing are regulated).

By this fuel injection method, when an area of the fuel channel into the cylinder 56 is changed by the piston 60, a flow rate of fuel into the cylinder 56 is changed, and a moving rate (displacement rate) of the piston 58 is changed. Accordingly, it becomes possible to arbitrarily set an pressure intensifying rate of fuel fed to the fuel injection nozzle 34, i.e., an injection rate of fuel injected from the fuel injection nozzle 34.

For example, in a case in which fuel at a downstream side of the intensifier 54 is intensified rapidly, a lift amount of the piston control valve 60 is increased, and a fuel channel area is also increased. By this, a pressure within the cylinder 56 is increased rapidly, a displacement rate of the piston 58 becomes quicker, and a rapid pressure lift can be obtained. On the other hand, in a case in which fuel at a downstream side of the intensifier 54 is slowly intensified, a lift amount of the piston control valve 60 is reduced, and a fuel channel area is made smaller. Consequently, a pressure inside the cylinder 56 is slowly increased, a displacement rate of the poison 58 becomes slower, and a slow pressure lift can be obtained.

In other words, inclination of an injection pressure (specifically, with regard to a pressure rising rate directly before reaching a maximum injection pressure (θ2), and a pressure drop rate at the completion of a main injection (θ3) of the fuel injection pattern shown in FIG. 1) is changed, it depends on an equilibrium between a fuel amount fed from the piston 58 and a fuel amount injected from the fuel injection nozzle 34 as to whether the injection pressure if the injection pressure increases, is kept constant, or decreases. If a fuel amount fed from piston 58 is larger than a fuel amount injected from the nozzle 34, an injection pressure increases. If the fuel amount fed from piston 58 and the fuel amount injected from the nozzle 34 are the same, an injection pressure is maintained constant. On the other hand, the fuel amount fed from the piston 58 is smaller than the fuel amount injected from the nozzle 34, an injection pressure decreases.

In this way, during a control of an opening area which is performed by the piston control valve 60 changing an area of a fuel channel (substantial opening area of a channel) toward the cylinder 56, a rate of increase and a rate of decrease of an injection pressure are directly changed. A maximum injection pressure changes in accordance with a rate of increase of the injection pressure.

As in the fuel injection pattern shown in FIG. 1, in a case in which a multi-injection for performing a pilot injection, a main injection and an after injection is carried out, a pressure rising rate after a completion of a boot injection period (θ1), a pressure rising rate directly before reaching a maximum injection pressure (θ2), a pressure drop rate at the completion of a main injection (θ3) and the like can be controlled freely (set or changed and performed).

FIGS. 13A to 13C, FIGS. 14A to 14D, and FIGS. 15A to 15D respectively show a schematic diagram of a method of setting an injection rate by the piston control valve 60 changing an area of the fuel channel toward the cylinder 56 in a case in which a multi-injection is performed with the fuel injection pattern shown in FIG. 1. In this case, FIGS. 13A to 13D show a pattern for changing a pressure rising rate after a completion of a boot injection period (θ1). FIGS. 13A to 13D show a pattern for changing a pressure rising rate after a completion of a boot injection period (θ1), FIGS. 14A to 14D show a pattern for changing a pressure rising rate directly before reaching a maximum injection pressure (θ2), and FIGS. 15A to 15D show a pattern for changing a pressure drop rate at the completion of a main injection (θ3).

In this way, in accordance with the fuel injection method of the present invention, a flow rate of fuel oil is controlled (a moving amount and a moving timing of the piston control valve 60 are regulated) by the piston control valve 60 changing an area of a fuel channel into the cylinder 56 (a substantial opening area of a channel). Accordingly an injection rate of fuel injected from the fuel injection nozzle 34 can arbitrarily be set (changed) (a degree of freedom of an fuel injection pattern on the basis of an injection rate of fuel can be increased).

More particularly, this fuel injection method is structured such that an area of a fuel channel into the cylinder 56 is changed by the piston control valve 60, and a flow rate of fuel flown into the cylinder 56 is changed and a moving rate (displacement rate) is changed. Accordingly, even when a maximum injection pressure is low, a rate of increase of an injection pressure can be set high.

Further, a description of a "main injection" has been made in the above explanation. However, in the same manner as the "main injection", with regard to an "after injection", a rate of increase and a rate of decrease of an injection pressure, and a pressure can be controlled by the piston control valve 60 changing and controlling an area of a fuel channel into the cylinder 56.

Further, in this case, usually, an amount of an after injection is quite smaller than that of a main injection. For example, an amount at one injection is 1 to 2 mm$^3$. In this case, since a lift of the needle valve 48 of the fuel injection nozzle 34 is at a seat choke period, it is difficult to clearly determine if a rate of increase and a rate of decrease of an injection pressure have been changed. However, when an injection amount is extremely small, due to a control of the opening area, a pressure after injection can be controlled. This absolutely means that a rate of increase or rate of decrease of the injection pressure is controlled. Further, in a case in which an amount of the after injection is equal to or greater than 5% of an amount of the main injection, this case is generally called "Split injection". In the case of the split injection, in the same manner as in the main injection, a rate of increase and a rate of decrease of an injection pressure, and a maximum injection pressure can be controlled due to a control of the opening area.

D. EXAMPLES OF FUEL INJECTION PATTERNS

Example 1

Figure 16:
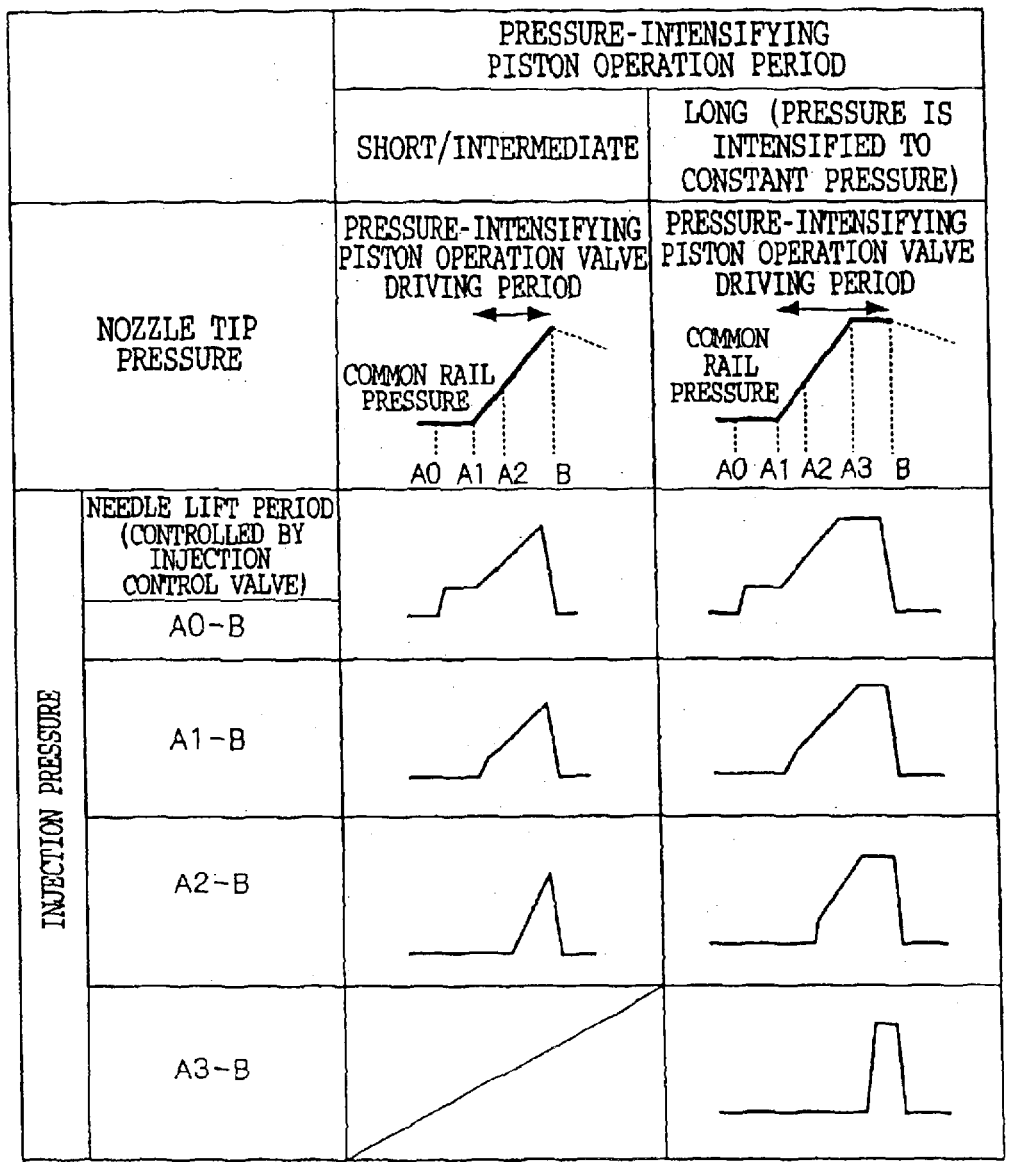
FIG. 16 is a schematic diagram illustrating an example of a method in which an injection amount and an injection pressure are set by the method of "controlling an operational phase difference between valves" among fuel injection methods in the fuel injector according to the present embodiment.

FIG. 16 shows a schematic diagram of a method of setting an injection amount and an injection pressure by respectively controlling an opening timing of the needle valve 48 (an operational timing of the injection control valve 52) and an operational timing of the intensifier 54 (operational timing of the piston control valve 60) (by controlling an operational phase difference between valves).

Here, FIG. 16 shows diagrams of patterns of changes in "injection pressure and injection amount" exerted when the injection control valve 52 is operated during respective periods of "from A0 to B", "from A1 to B", "from A2 to B" and "from A3 to B" in a case in which the piston control valve 60 is operated during a period of from "A1 to B". Further, in examples shown in FIG. 16, a case is illustrated when an injection pressure is intensified by operating the intensifier 54 until fuel injection is completed.

In this way, in the fuel injection method according to the present invention, while an injection pressure can be progressively increased due to an operation of the intensifier 54, since an injection timing can be selected due to an opening timing of the needle valve 48, a fuel injection pattern on the basis of an injection pressure and an injection amount of fuel is made possible.

Accordingly, fuel can be injected at an injection pressure that is much higher than that in a conventional injector, and a maximum injection pressure is not determined merely by a fuel pressure due to a geometric intensified pressure ratio of the accumulator 32, and is able to realize excellent combustible and exhaustive characteristics, and fuel injection can be carried out with an arbitrary fuel injection pattern (a degree of freedom of a fuel injection pattern on the basis of a fuel injection pressure and a fuel injection amount is expanded).

Example 2

Figure 17:
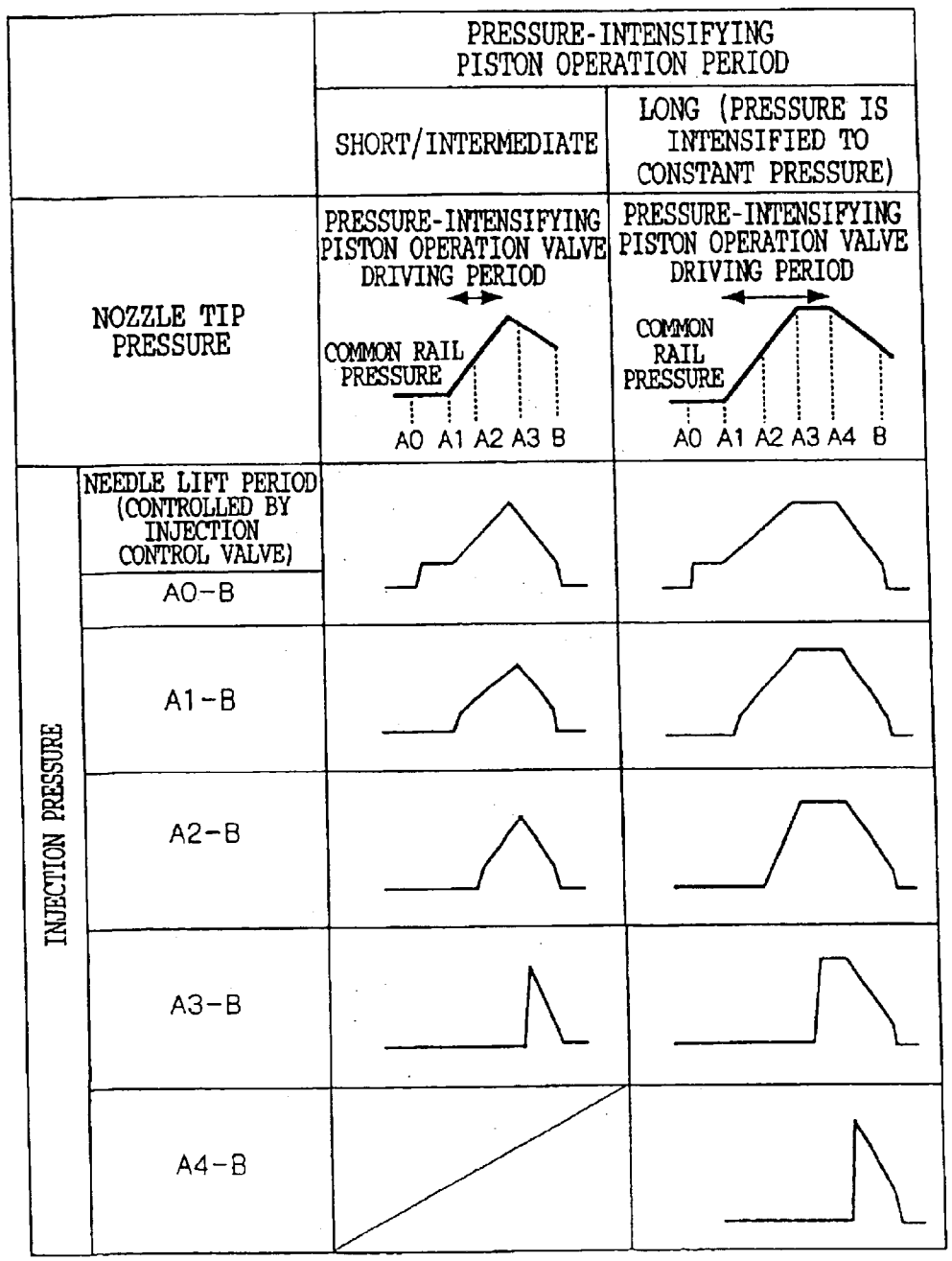
FIG. 17 a schematic diagram illustrating an example of a method in which an injection amount and an injection pressure are set by the method of "controlling an operational phase difference between valves" among fuel injection methods in the fuel injector according to the present embodiment.
Figure 18A:
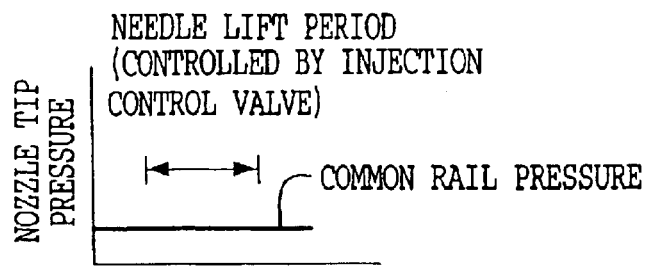
FIG. 18A is a schematic diagram illustrating an example of a method of "setting an injection amount and an injection pressure" among fuel injection methods in the fuel injector according to the present embodiment, and a change of a nozzle tip pressure.
Figure 18B:
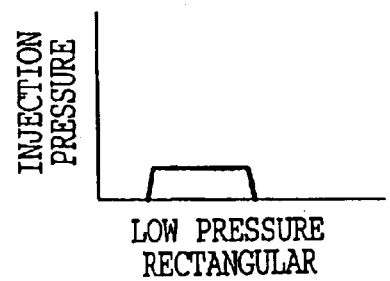
FIG. 18B is a schematic diagram illustrating an example of the method of "setting an injection amount and an injection pressure" among fuel injection methods in the fuel injector according to the present embodiment, and a change of an injection pressure.
Figure 19A:
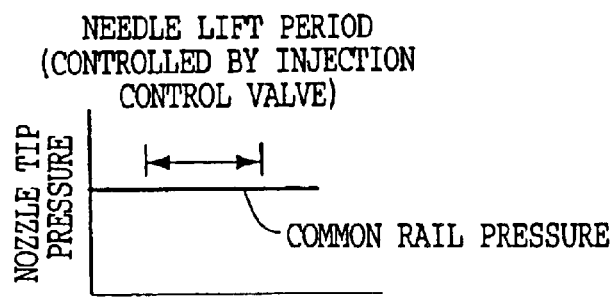
FIG. 19A is a schematic diagram illustrating an example of a method of "setting an injection amount and an injection pressure" among fuel injection methods in the fuel injector according to the present embodiment, and a change of the nozzle tip pressure.
Figure 19B:
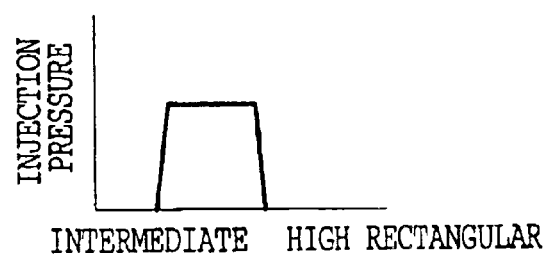
FIG. 19B is a schematic diagram illustrating an example of the method of "setting an injection amount and an injection pressure" among fuel injection methods in the fuel injector according to the present embodiment, and a change of the injection pressure.

FIG. 17 shows a schematic diagram of a method of setting an injection amount and an injection pressure by respectively controlling an opening timing of the needle valve 48 (an operational timing of the injection control valve 52) and an operational timing of the intensifier 54 (operational timing of the piston control valve 60) (by controlling an operational phase difference between valves).

Here, FIG. 17 shows diagrams of patterns of changes in "injection pressure and injection amount" exerted when the injection control valve 52 is operated during respective periods of "from A0 to B", "from A1 to B", "from A2 to B", "from A3 to B" and "from A4 to B" in a case in which the piston control valve 60 is operated during respective periods of "from A1 to A3" and "from A1 to A4". Further, FIG. 17 shows examples of a case when intensification of an injection pressure by using the intensifier 54 is suspended during the fuel injection.

In this way, in the fuel injection method according to the present invention, while an injection pressure can be progressively increased due to an operation of the intensifier 54, since an injection timing can be selected due to an opening timing of the needle valve 48, a fuel injection pattern on the basis of an injection pressure and an injection amount of fuel is enabled.

Accordingly, fuel can be injected at an injection pressure that is much higher than that in a conventional injector, and a maximum injection pressure is not determined merely by a fuel pressure due to a geometric intensified pressure ratio of the accumulator 32, and is able to realize excellent combustible and exhaustive characteristics, and fuel injection can be carried out with an arbitrary fuel injection pattern (a degree of freedom of a fuel injection pattern on the basis of a fuel injection pressure and a fuel injection amount is expanded).

Example 3

FIGS. 18A and 18B, and FIGS. 19A and 19B respectively show a schematic diagram of a method of setting an injection amount and an injection pressure at a common rail pressure by the accumulator 32 without operating the intensifier 54.

As can be seen from FIGS. 18A and 18B, and FIGS. 19A and 19B, an injection amount and an injection pressure can be arbitrarily set by controlling a setting of a common rail pressure due to the accumulator 32 and an opening timing of the needle valve 48 (operational timing of the injection control valve 52).

Example 4

FIGS. 20A and 20B, FIGS. 21A and 21B, FIGS. 22A and 22B, and FIGS. 23A and 23B respectively show a schematic diagram of a method of setting an injection amount and an injection pressure for an after injection by individually controlling an opening timing of the needle valve 48 (an operational timing of the injection control valve 52) and an operational timing of the intensifier 54 (operational timing of the piston control valve 60) (by controlling an operational phase difference between valves).

Figure 20A:
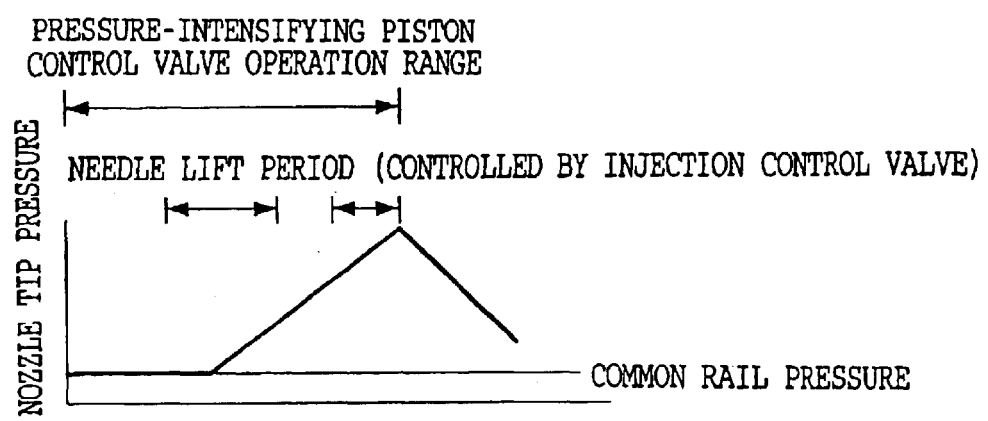
FIG. 20A is a schematic diagram illustrating an example of a method of "setting an injection pressure (after injection pressure)" among fuel injection methods in the fuel injector according to the present embodiment, and also illustrating examples of a boot-shape main injection and a high pressure after injection.
Figure 20B:
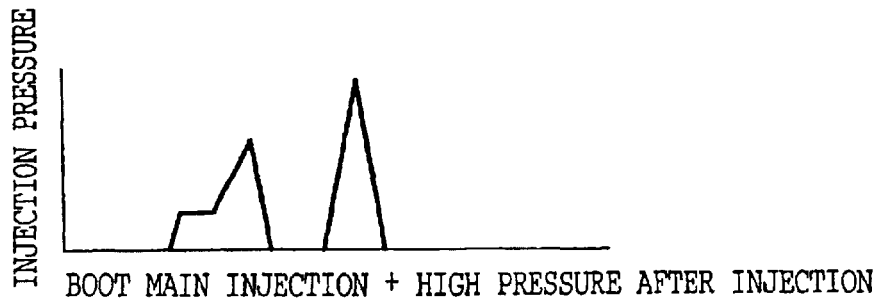
FIG. 20B is a schematic diagram illustrating an example of the method of "setting an injection pressure (after injection pressure)" among fuel injection methods in the fuel injector according to the present embodiment, and examples of the boot-shape main injection and the high pressure after injection.
Figure 21A:
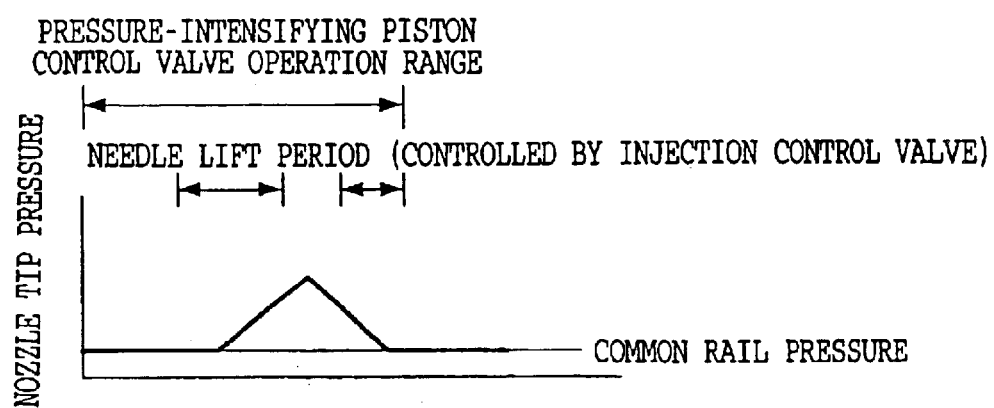
FIG. 21A is a schematic diagram illustrating an example of a method of "setting an injection pressure (after injection pressure)" among fuel injection methods in the fuel injector according to the present embodiment, and examples of a boot-shape main injection and a low pressure after injection.
Figure 21B:
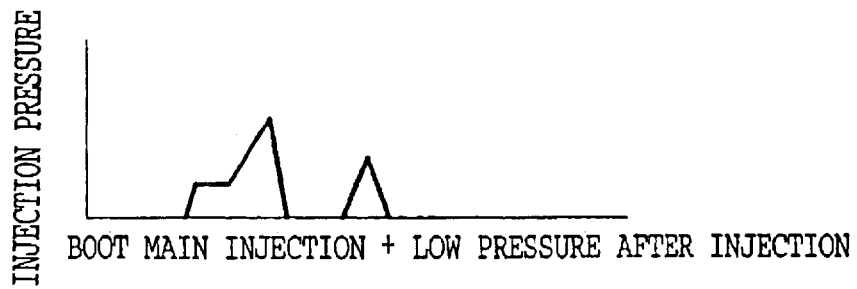
FIG. 21B is a schematic diagram illustrating an example of the method of "setting an injection pressure (after injection pressure)"among fuel injection methods in the fuel injector according to the present embodiment, and examples of the boot-shape main injection and the low pressure after injection.
Figure 22A:
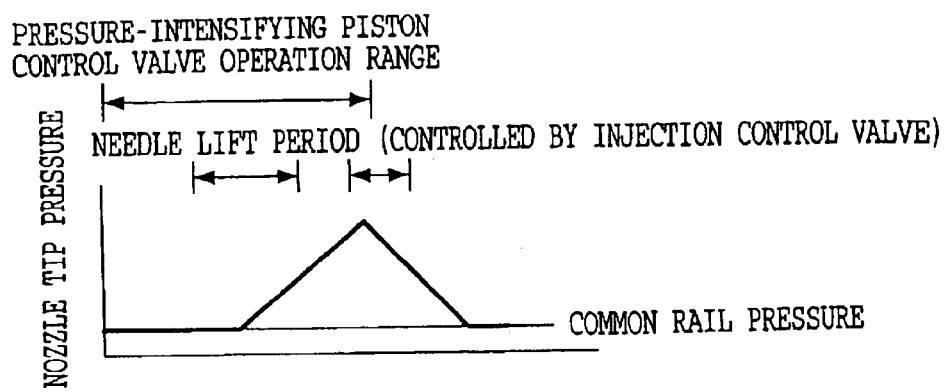
FIG. 22A is a schematic diagram illustrating an example of a method of "setting an injection pressure (after injection pressure)" among fuel injection methods in the fuel injector according to the present embodiment, and examples of a boot-shape main injection and a medium pressure after injection.
Figure 22B:
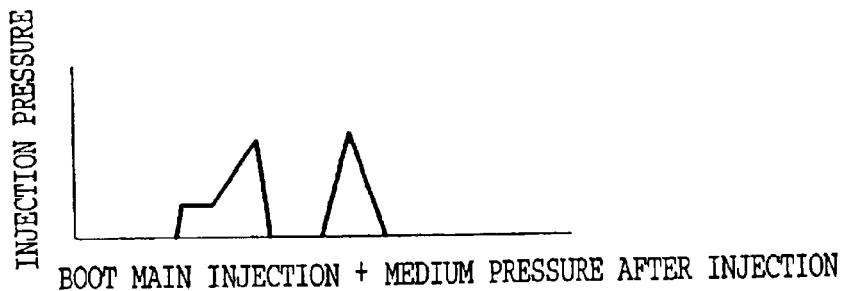
FIG. 22B is a schematic diagram illustrating an example of the method of "setting an injection pressure (after injection pressure)" among fuel injection methods in the fuel injector according to the present embodiment, and examples of the boot-shape main injection and the medium pressure after injection.
Figure 23A:
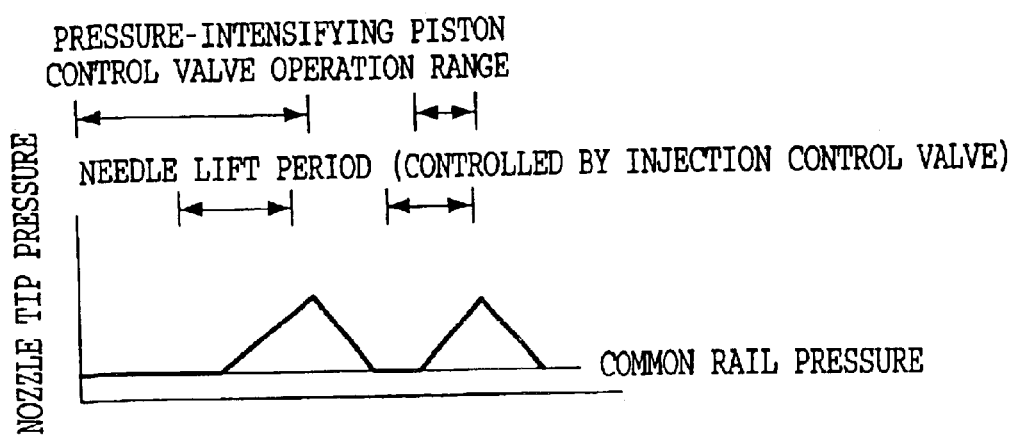
FIG. 23A is a schematic diagram illustrating an example of a method of "setting an injection pressure (after injection pressure)" among fuel injection methods in the fuel injector according to the present embodiment, and examples of a boot-shape main injection and a boot-shape after injection.
Figure 23B:
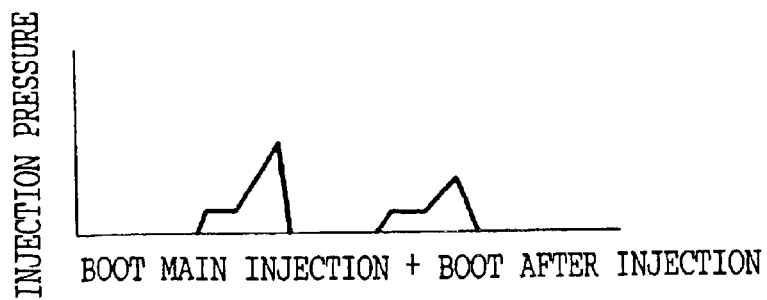
FIG. 23B is a schematic diagram illustrating an example of the method of "setting an injection pressure (after injection pressure)" among fuel injection methods in the fuel injector according to the present embodiment, and examples of the boot-shape main injection and the boot-shape after injection.

Here, FIGS. 20A and 20B show an example of a boot-shape main injection and a high pressure after injection, FIGS. 21A and 21B show an example of a boot-shape main injection and a low pressure after injection, FIGS. 22A and 22B show an example of a boot-shape main injection and a medium pressure after injection, and FIGS. 23A and 23B show an example of a boot-shape main injection and a boot shape after injection.

As can be seen from respective figures, an injection pressure in a case of an after injection can be arbitrarily set by individually controlling an opening timing of the needle valve 48 (an operational timing of the injection control valve 52) and an operational timing of the intensifier 54 (operational timing of the piston control valve 60) (by controlling an operational phase difference between valves).

In each of the figures, an example has been shown in which a main injection is formed into a boot shape. However, the present invention is not limited to this, and various patterns can be set with regard to an after injection.

Example 5

In the above-described Examples 1 to 4, the present invention has been explained by applying each of the fuel injection methods to the fuel injector 30 in the Structural Example 1. However, the present invention is not limited to this, and even with the fuel injector according to the aforementioned Structural Example 2, namely, even in a case in which the fuel injector is structured so as to carry out a driving of the intensifier 45 by using a lift cam, various fuel injection patterns can be set, whereby operations and effects can be exhibited in the same manner as in Examples 1 to 4.

Example 6

As described above, the pressure rising rate after a completion of a boot injection period ($\theta 1$), the pressure rising rate directly before reaching a maximum injection pressure ($\theta 2$), and the pressure drop rate at the completion of a main injection ($\theta 3$) can be changed by the piston control valve 60 changing the fuel channel area of the cylinder 56. However, the present invention is not limited to this, and instead, the main boot shape injection pressure ($P_2$) or the main injection maximum pressure ($P_3$) can be changed, or a boot shape injection pattern itself can be changed and a two stage type boot shape injection pattern can be employed.

Figure 24A:
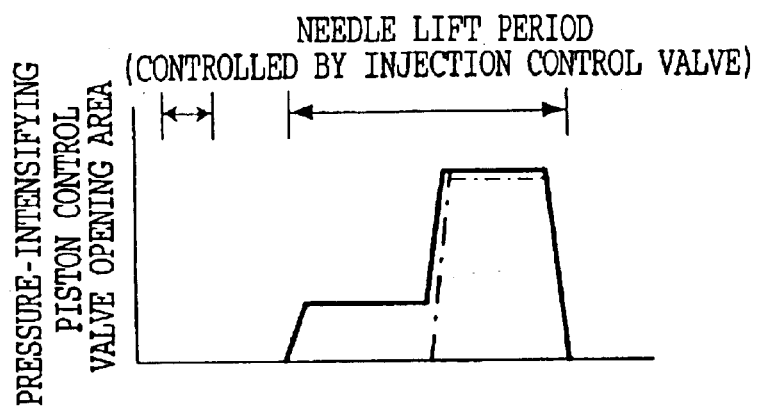
FIG. 24A is a schematic diagram illustrating an example of a method of "changing a boot injection pressure" among fuel injection methods in the fuel injector according to the present embodiment, and a change of an opening area of a pressure-intensifying piston control valve.
Figure 24B:
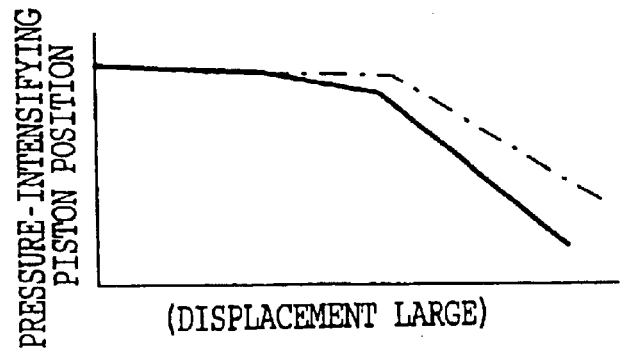
FIG. 24B is a schematic diagram illustrating an example of the method of "changing a boot injection pressure" among fuel injection methods in the fuel injector according to the present embodiment, and a change of a position of the pressure-intensifying piston.
Figure 24C:
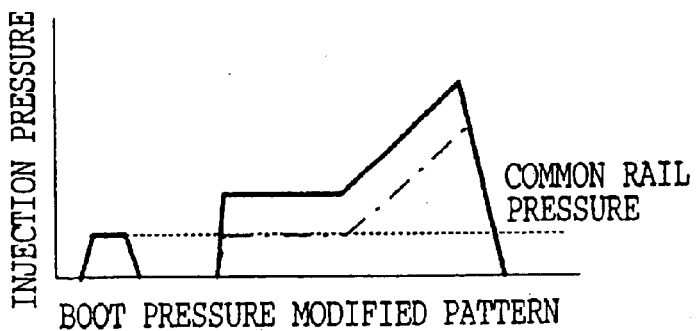
FIG. 24C is a schematic diagram illustrating an example of the method of "changing a boot injection pressure" among fuel injection methods in the fuel injector according to the present embodiment, and a change of an injection pressure.
Figure 25A:
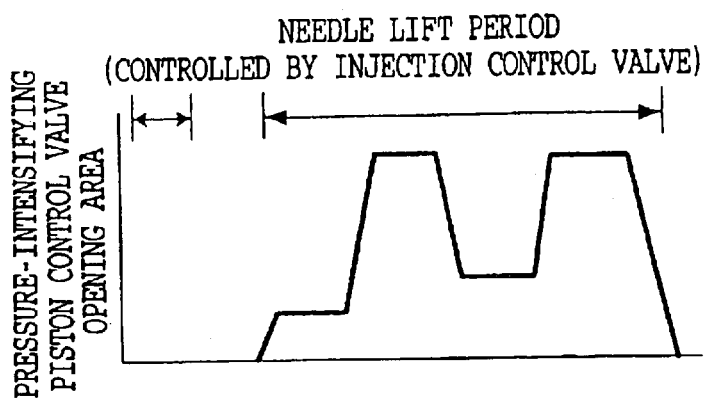
FIG. 25A is a schematic diagram illustrating an example of a method of "carrying out a two-stage boot shape injection pressure" among fuel injection methods in the fuel injector according to the present embodiment, and a change of an opening area of a pressure-intensifying piston control valve.
Figure 25B:
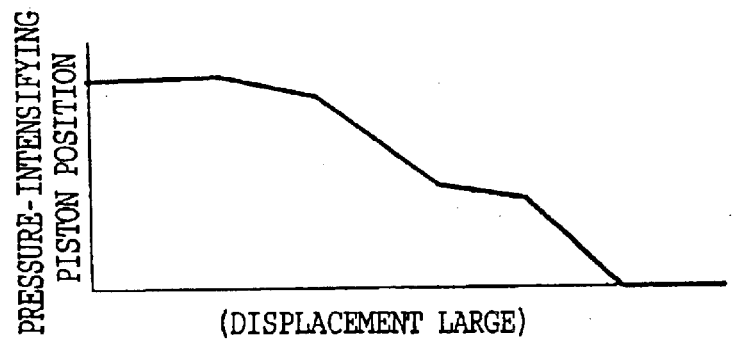
FIG. 25B is a schematic diagram illustrating an example of the method of "carrying out a two-stage boot shape injection pressure" among fuel injection methods in the fuel injector according to the present embodiment, and a change of a position of the pressure-intensifying piston.
Figure 25C:
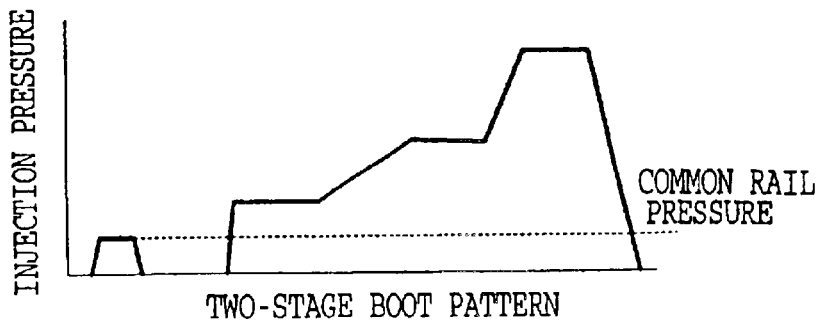
FIG. 25C is a schematic diagram illustrating an example of the method of changing a two-stage boot injection pressure, among fuel injection methods in the fuel injector according to the present embodiment, and a change of an injection pressure.
Figure 27A:
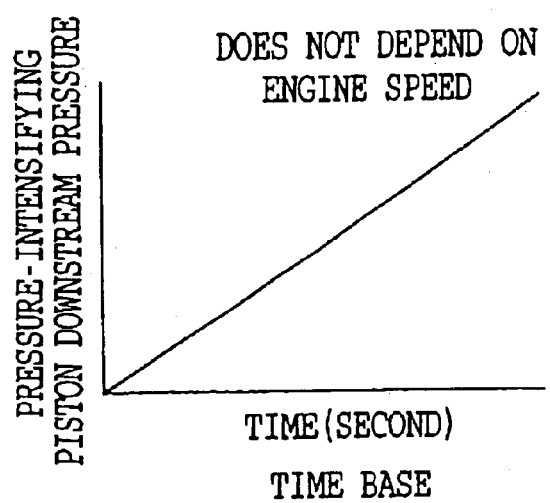
FIG. 27A is a diagram illustrating a state in which a pressure at a downstream side of the intensifier changes with time when fuel injection is performed by a fuel injection method in a conventional fuel injector.
Figure 27B:
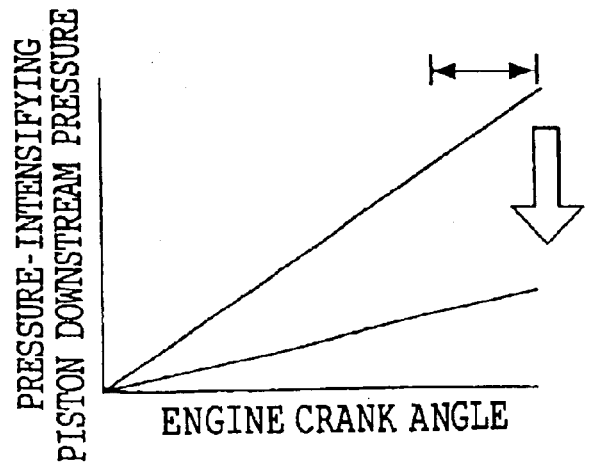
FIG. 27B is a diagram illustrating a state in which a pressure at a downstream side of the intensifier changes with respect to an engine crank angle when fuel injection is performed by the fuel injection method in the conventional fuel injector.
Figure 28:
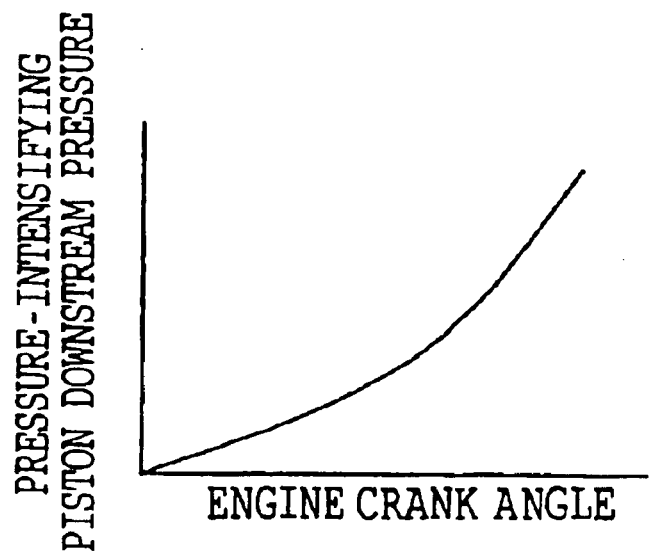
FIG. 28 is a diagram corresponding to FIG. 27B and illustrating a preferable state in which a pressure at a downstream side of the intensifier changes during the fuel injection.

For example, FIGS. 24A to 24C respectively show a schematic diagram of an injection pattern when a boot injection pressure on a boot shape injection pattern is changed. Further, FIGS. 25A to 25C respectively show a schematic diagram of an injection pattern when a two stage boot type injection is carried out.

Thus, in the fuel injection method according to the present embodiment, an injection rate of fuel injected from the fuel injection nozzle 34 can be arbitrarily set (changed) by controlling a flow rate of fuel oil into the cylinder 56 by the piston control valve 60 changing an area of a fuel channel toward the cylinder 56 (a degree of freedom of a fuel injection pattern on the basis of a fuel injection rate can be expanded).

Example 7

In Example 6 described above, with regard to the piston control valve 60, the present invention is structured such that an injection rate of fuel injected from the fuel injection nozzle 34 can be arbitrarily set (changed) by controlling a flow rate of fuel oil into the cylinder 56 by the piston control valve 60 changing an area of the fuel channel (substantial opening area of the channel) toward the cylinder 56. However, the present invention is not limited to this, and can be structured such that an area of the fuel channel (apparent opening area of the channel) toward the cylinder 56 can be changed by periodically opening/closing the piston control valve 60 for a short period of time.

In other words, as shown in FIG. 26, opening/closing of the piston control valve 60 periodically for a short period of time corresponds to a case in which an opening area itself of a channel is changed by the piston control valve 60. Consequently, the piston control valve 60 is opened/closed periodically for a short period of time, an apparent opening area of a channel is changed, and a flow rate of fuel oil can be controlled.

Example 8

In the aforementioned Example 6 and Example 7, with regard to the piston control valve 60, the present invention is structured such that an injection rate of fuel injected from the fuel injection nozzle 34 can be arbitrarily set (changed) by controlling a flow rate of fuel oil "into" the cylinder 56 by the piston control valve 60 changing an area of the fuel channel (substantial opening area of the channel) toward the cylinder 56. However, the present invention is not limited to this, and can be structured such that a "flow rate" of fuel oil "out of" the cylinder 56 can be controlled by the piston control valve 60 changing an area of the fuel channel, whereby an injection rate of fuel injected from the fuel injection nozzle 34 can be arbitrarily set (changed).

Also in this case, various fuel injection patterns can be set and operations and effects can be exhibited in the same manner as in the above-described Example 6 and Example 7.

INDUSTRIAL APPLICABILITY

As described above, the fuel injection method in the fuel injector according to the present invention can be used for a fuel injector of an internal combustion engine such as a diesel engine which is loaded in a vehicle and driven by injecting a pumped fuel into a cylinder.

What is claimed is:

1. A fuel injection method in a fuel injection system, said fuel injection system comprising:

a fuel injection nozzle including a fuel reservoir and a needle valve;

an accumulator which accumulates fuel at a predetermined pressure;

a fuel line through which the fuel reservoir and the accumulator are connected;

a pressure cutoff valve which is provided along the fuel line, for cutting off fuel pressure flow from the fuel injection nozzle to the accumulator;

an injection control fuel chamber which is connected to the fuel line at a downstream side of the pressure cutoff valve;

an injection control valve which performs fuel injection by closing the needle valve due to an action of a fuel pressure upon the injection control fuel chamber and by opening the needle valve due to removal of fuel from the injection control fuel chamber;

an intensifier which is connected to the fuel injection nozzle and the injection control fuel chamber at a downstream side of the pressure cutoff valve; and intensifier control means which increases a fuel pressure at a downstream side of the pressure cutoff valve by operating the intensifier, said fuel injection method comprising the steps of:

suspending operation of the intensifier control means; and performing an after injection of fuel at an intermediate pressure between a predetermined pressure of the accumulator and a static maximum pressure which is statically determined due to operation of the accumulator and the intensifier.

2. The fuel injection method according to claim 1, wherein when an amount in which fuel is injected by the fuel injection nozzle is maximum, a period during which pressure of fuel injected increases is set so as to correspond to ⅓ or more of the entire injection period.

3. The fuel injection method according to claim 1, wherein when the intensifier is operated by the intensifier control means, before reaching a static maximum pressure which is statically determined by a geometric intensified pressure ratio of the intensifier and a pressure of the accumulator due to operation of the accumulator and the intensifier, the injection control valve is operated to start fuel injection from the fuel injection nozzle, and a maximum injection pressure of fuel injected from the fuel injection nozzle is set to be equal to or less than the static maximum pressure.

4. The fuel injection method according to claim 1, wherein when fuel injection from fuel injection nozzle is suspended by the injection control valve, before the needle valve is completely closed, operation of the intensifier control means is suspended to stop the intensifier, whereby an injection pressure of fuel injected from the fuel injection nozzle is decreased to a predetermined pressure.

5. The fuel injection method according to claim 1, wherein an opening speed and a closing speed of the needle valve is set such that the higher the fuel pressures of both the fuel reservoir and the injection control fuel chamber are, the higher the opening speed and the closing speed of the needle valve are.

6. The fuel injection method according to claim 1, wherein when a multi-stage injection is performed in which fuel injection from the fuel injection nozzle is carried out a plurality of times per 1 cycle of an engine, the intensifier is operated at least two or more times by the intensifier control means.

7. The fuel injection method according to claim 1, wherein the intensifier comprises a cylinder and a piston and wherein fuel is injected by controlling a moving rate of the intensifier piston so as to arbitrarily change at least one of a maximum injection pressure, a rate of increase of the injection pressure at the start of an increase of pressure, a rate of decrease of the injection pressure at the completion of injection, a pilot injection pressure, and an after injection pressure, of fuel injected from the fuel injection nozzle.

8. The fuel injection method according to claim 7, wherein the intensifier control means comprises a piston control valve and wherein the fuel injection is performed by individually controlling each of the injection control valve and the piston control valve, and regulating an operational phase difference therebetween.

9. The fuel injection method according to claim 7, wherein the moving rate of the intensifier piston is controlled by the piston control valve changing an area of a fuel line into the intensifier cylinder.

10. The fuel injection method according to claim 9, wherein the area of the fuel line into the cylinder is changed by the piston control valve during a period when the needle valve is open.

11. The fuel injection method according to claim 9, wherein when a multi-stage injection is performed in which fuel injection from the fuel injection nozzle is carried out a plurality of times per 1 cycle of an engine, a maximum area of the fuel line into the cylinder due to the piston control valve is individually set for each injection.

* * * * *